United States Patent [19]
Schaffner et al.

[11] Patent Number: 5,909,336
[45] Date of Patent: Jun. 1, 1999

[54] POSITION DETECTION SCHEME FOR HEADERLESS DISK CONTROLLER

[75] Inventors: James Schaffner, Niwot, Colo.; Dong Cho, Pomona, Calif.; Kang Xiao, Aliso Viejo, Calif.; Mark J. Blair, Irvine, Calif.; Joanne Wu, Diamond Bar, Calif.; Patrick Conley, Fullerton, Calif.; Stephen Finch, Lake Forest, Calif.

[73] Assignee: Texas Instruments Incorporated, Dallas, Tex.

[21] Appl. No.: 08/802,293

[22] Filed: Feb. 18, 1997

[51] Int. Cl.⁶ .................................................. G11B 5/596
[52] U.S. Cl. .................................. 360/77.08; 360/77.02
[58] Field of Search .............................. 360/77.08, 77.11, 360/77.12, 77.07, 77.06, 77.05, 77.02, 77.01, 75, 69, 47, 48, 49, 50, 51, 53

[56] References Cited

U.S. PATENT DOCUMENTS

| | | | |
|---|---|---|---|
| 5,668,679 | 9/1997 | Swearingen et al. | 360/75 |
| 5,729,718 | 3/1998 | Au | 360/48 |
| 5,796,535 | 8/1998 | Tuttle et al. | 360/51 |
| 5,796,543 | 8/1998 | Ton-That | 360/48 X |

*Primary Examiner*—Muhammad Edun
*Attorney, Agent, or Firm*—W. Daniel Swayze, Jr.; Wade James Brady, III; Richard L. Donaldson

[57] ABSTRACT

The present invention provides a method and apparatus for providing position detection using a unique binary sequence encoded in indexing bits stored in servo wedges. The present invention generates a unique binary sequence (UBS) code and stores the bits of such a code in the indexing bits of the servo wedges. The bits are read from the servo wedges and used to provide unique identification of head position. Each servo wedge and each data field can be uniquely identified, even servo wedges and data fields under different heads. The present invention may be used to provide initial position detection, position verification during normal operation, and position verification upon head switching. When used for position verification, the present invention uses a confidence block to determine the confidence level with which the head is believed to be correctly positioned. One or more programmable thresholds may be used to qualify operations such as reading information from a disk, writing information to a disk, or seeking a location on a disk. If these thresholds are not met for the corresponding operations, the initial position detection capability of the present invention may be used to provide position recovery.

17 Claims, 11 Drawing Sheets

POSITION DETECTION SCHEME FOR HEADERLESS DISK CONTROLLER

BACKGROUND OF THE INVENTION

1. Field of the Invention

The present invention relates to the field of data storage systems, particularly to electronic controllers for controlling the operation of rotating rewritable (read/write) data storage devices.

2. Background Art

Computer systems employ data storage devices, for example, disk drives, to store various data for use by the computer system. A typical data storage device includes storage media, in which the actual data is stored, a read head, and a mechanism, such as a motor, for imparting relative motion between the storage media and the read head. The relative motion allows access to various portions of the storage media, and, in the case of certain types of media, such as magnetic media, allows for the production of signals representative of the data stored in the storage media.

In general, disk memories are characterized by the use of one or more magnetic media disks mounted on a spindle assembly and rotated at a high rate of speed. Each disk typically is round and has two surfaces of magnetic media. In a typical rotating medium as a storage system, data is stored on magnetic or magneto-optical disks in a series of concentric "tracks," with each track being an addressable area of the memory array. A read/write head is provided for each surface of each disk in the disk storage system. These tracks are accessed by a read/write head that detects variations in the magnetic orientation of the disk surface. The read/write head moves back and forth radially on the disk under control of a head-positioning servo mechanism so that it can be selectively positioned over a selected one of the tracks. Once in position over a track, the servo mechanism causes the head to trace a path that follows the center line of the selected track.

A data storage device may have several modes of operation. For example, a device may have a read mode during which data from the media is recognized and gathered, a write mode during which the stored data is written onto the media, a signal gap mode between the read mode and the write mode during which no reading or writing activity occurs, and a servo mode during which positional information is derived from the storage media for use to maintain the correct relationship between the read head and the storage media. Disk drives are used to store data by recording it on rotating media.

Data is typically stored in concentric rings known as tracks. To ensure that data may be accurately retrieved from a disk drive, the data must be stored in known locations. A number of methods have been used to provide for the correct positioning of data on a disk and for correct positioning of the read/write head relative to the data. One such method is used in an "embedded servo" disk drive. An embedded servo disk drive has positioning (servo) information recorded on the disk along with the data. The positioning information is used to control a servomechanism that then continually adjusts the position of the read/write head so that data will be read from and/or written to the disk at the proper location. This positioning information is typically located in servo gaps that occur periodically along a track. The angular distance between adjacent servo gaps is referred to as the servo interval. While reading and writing of data may occur over the servo interval, the reading and writing of user data is temporarily suspended at the beginning of a servo gap and resumed at the end of the servo gap.

In conventional systems, the position information is usually described by an ID (identification) field, followed by a data field. However, for drives with a magnetoresistive (MR) type of head, the rotary actuator used to position the MR head is known to introduce a skew angle between the MR read element and the inductive write element relative to the data tracks. A method is known to compensate the skew angle by using two ID fields, one offset with the conventional ID field. However, the disadvantage of this method is that the redundant ID field causes a commensurate loss of storage capacity (typically about 9%).

Instead of using an ID field for position information, a large servo wedge, which contains multiple bits of head and wedge information in addition to other servo fields required for correct recovery, may be used for position detection. This headerless format, which does not have ID field in front of data field, avoids the skew angle problem with an MR head. However, this approach often requires major changes to the mode in existing subsystems servo rework.

Yet another approach uses binary counters. By counting both index and sector pulses, physical wedge positions can be determined. However, this technique is usually prone to errors because the timing cannot be resolved accurately enough and hence is not a reliable method.

A current servo field usually has a single bit associated with each servo wedge to perform indexing. Among all the wedges, a bit of 1 can, for example, be assigned to a particular wedge and bits of 0 can be assigned to all other wedges. Thus, when a 1 bit is detected twice, it is then known that one complete revolution of the medium has occurred. However, this technique uniquely identifies only the single wedge having the 1 bit. The technique fails to provide unique identification about all the wedges having 0 bits.

Furthermore, more information could be added to the servo wedge. This information could be the entire header ID. This creates a problem because each bit added to the servo wedge occupies space resulting from the fact that the servo wedge is always recorded at a lower frequency than the data. This results in lost capacity saving just to implement a headerless scheme. It is desirable to save as much space in the servo wedge as possible.

Thus, a technique is needed to provide servo information and to uniquely identify data fields while maximizing storage capacity and reliability and avoiding complicated redesign of the servo system.

SUMMARY OF THE INVENTION

The present invention provides a method and apparatus for providing position detection using a unique binary sequence encoded in the existing indexing bits of the disk in servo wedges. The present invention provides reliable, error tolerant position detection without reducing storage capacity or requiring redesign of the servo system.

The present invention is applicable to headerless disk storage systems and utilizes indexing bits already available within servo wedges located around a disk. The present invention operates using a unique binary sequence (UBS) code stored in the indexing bits of the servo wedges. The bits are read from the servo wedges and used to provide unique identification of head position. The invention enables each servo wedge and each data field to be uniquely identified, even servo wedges and data fields located under different heads.

The present invention may be used to provide initial position detection, position verification during normal operation, and position verification after head switching. Initial position detection can be achieved in less than two revolutions of a disk. When used for position verification, the present invention uses a confidence decision scheme to determine the confidence level with which the head is believed to be correctly positioned. A mismatch of the bit values read from the servo wedges with the expected bit values lowers the confidence level, while a match between the values raises or maintains the confidence level. One or more programmable thresholds may be used to qualify different operations such as reading information from a disk, writing information to a disk, or seeking a location on a disk. If these thresholds are not met for the corresponding operations, the initial position detection capability of the present invention may be used to provide position recovery. The position verification feature may also be used to verify that head switching has occurred completely and properly.

Thus, the present invention overcomes the disadvantages of the prior art.

DETAILED DESCRIPTION OF THE INVENTION

Figure 1:
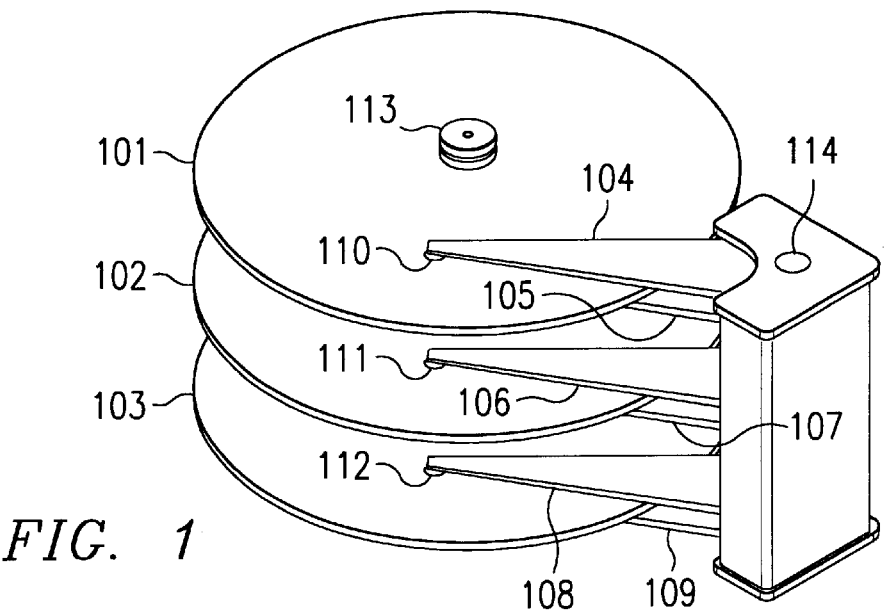
FIG. 1 is a perspective diagram illustrating the physical configuration of a typical disk drive.

A method and apparatus for providing position detection using a unique binary sequence distributed and/or stored in servo wedges is described. In the following description, numerous specific details are set forth in order to provide a more thorough understanding of the present invention. It will be apparent, however, to one skilled in the art, that the present invention may be practiced without these specific details. In other instances, well-known features have not been described in detail in order not to unnecessarily obscure the present invention.

To identify the location of a head relative to the storage medium, position information is stored at known locations on the storage medium. However, such position information requires storage space that might otherwise be used to store user data. Thus, a technique is needed to provide position information efficiently without using excessive storage space.

The present invention avoids the problems of the prior art techniques by reliably providing position information while using a minimal amount of storage space. Servo wedges contain servo information to allow a servo system to maintain proper head alignment. Each servo wedge also contains a single bit used as an indexing bit. In the prior art, the indexing bit of one servo wedge is set to one, while the indexing bits of all other servo wedges are set to zero. This prior art technique provides indication of each revolution of the storage medium, but fails to uniquely identify each servo wedge and each data field.

The present invention provides a new position detection scheme for headerless systems. The present invention provides format efficiency for disk drives and also provides a low cost reliable solution for drives with an MR head and a rotary actuator. By using the single bit currently associated with each servo wedge for indexing purposes, the present invention can perform both physical position detection and position sanity check with regard to a head and a wedge. Since no hardware servo changes are required, this new scheme can be applied to existing systems.

The present invention provides a better utilization of the indexing bits stored in the servo wedges. The present invention sets the indexing bits to be 1's or 0's according to a specified pattern. By taking a partial sequence of 7 or 8 bits at a time, depending on the number of servo wedges in the system, a unique number sequence is produced. The unique number sequence provides unique identification for each servo wedge and each data field on the storage medium. For each servo wedge, there is a unique corresponding number. These numbers are not repeated within the sequence, so the mapping from binary number to servo wedge position is one-to-one. When properly designed, the present invention using a unique binary sequence can identify any physical head/wedge combination. Thereby, the present invention offers advantages over the prior art by increasing format efficiency, avoiding servo modification (redefining the index bit in a servo field is sufficient), and providing error tolerant operation (the projected misdetection probability is $1.0 \times 10^{-15}$).

The position detection scheme according to the present invention is designed to be compatible with systems in which the hard disk channel raw bit error rate is less than or equal to $1.0 \times 10^{-7}$, the servo subsystem handles "track ID" (Cylinder), and the servo subsystem can report servo sync error. Mechanical shock can be compensated by servo subsystem logic and spindle logic (For example, the servo subsystem can report track ID error and servo sync status to the microcontroller).

The present invention provides for three types of operations. First, the invention provides initial position detection. Second, the invention provides for a succeeding position sanity check. Third, the invention provides for a reposition check upon head switching.

The initial position detection can be used after power on reset or position recovery. One revolution is required to determine the head ID and wedge ID in initial position detection. For example, for a 3-platter drive with 6 heads and 64 embedded servo wedges per head, after one revolution (i.e. after receiving 64 bits with one bit from each servo wedge), the head ID and wedge ID can be determined with misdetection rate less than $1.0 \times 10^{-15}$, given any arbitrary starting position and channel raw bit error rate of $1.0 \times 10^{-7}$.

The succeeding position detection provides a sanity check after initial detection or after position check upon switching heads. By comparing the single bit from the servo with the predicted bit pattern, any mismatch could imply that the controller has lost "confidence" in a read operation. The threshold used to qualify the confidence level may be programmable (and may be programmed into firmware, for example). If the confidence level drops too low, the initial position detection is used for recovery.

The position check at head switch checks the head ID and the wedge ID after switching heads. N number of bits with one bit from each servo wedge is required to build enough confidence for accurate head and wedge identification. Since 8 to 10 servo wedges are typically required for seek and settle before write operation can start after switching heads in modern systems, N should preferably be no greater than 8 to avoid increasing system latency. N is a programmable parameter.

Binary sequences formed by preferably one or two bits from each servo wedge are used for the above operations. The allowable binary sequences preferably have a number of characteristics.

Each head preferably has its own unique sequence. The sequences are distinct from each other with any arbitrary starting point such that errors are allowed to occur and head identification can still be detected in initial position detection operation with misdetection rate preferably less than $1.0 \times 10^{-15}$.

Each wedge has a unique identifier (ID) generated from the sequence. The sequence preferably has closure so that it can start at any point and provide a wedge ID after N number of servo bits.

The wedge ID of a wedge location before head switch is distinct from the wedge ID which is created by N number of servo bits after a head switch. Sufficient Hamming distance between the wedge ID's is desired for error tolerance. While head switching can occur between any heads, one embodiment of the present invention assumes that head switching occurs only within the range from physical wedge number X to (X+K), where typically 0<K<3. This assumption regarding the permissible range of K can be modified to accommodate a larger or smaller range of K.

Upon head switching, error tolerant capability and performance as affected by latency are roughly inversely related. The bigger the N number is, the better error tolerance the code can provide but more latency is introduced. Here, N is the number of servo bits needed for head ID and wedge ID.

One embodiment of the present invention provides a technique to generate the numerical sequences for position detection to be used by drives with up to six heads and up to one hundred embedded servo wedges. For initial position detection, head ID and wedge ID can be successfully detected after one revolution with misdetection rate less than $1.0 \times 10^{-27}$. For position check at head switch, head ID and wedge ID can also be identified.

FIG. 1 is a perspective diagram illustrating the physical configuration of a typical disk drive. The disk drive comprises one or more disks 101, 102, and 103, rotating about a common spindle 113. A head 110, 111, and 112, is provided for each surface of each disk 101, 102, and 103.

Head 110 is mounted on head arm 104, which is coupled to head arm mount 114. Head arm 105 is coupled is a head on the opposite side of disk 101 and to head arm mount 114. Head 111 is coupled to head arm 106. Head arm 106 is coupled to head arm mount 114. Head arm 107 is coupled to a head on the opposite of disk 102 and to head arm mount 114. Head 112 is coupled to head arm 108. Head arm 108 is coupled to head arm mount 114. Head arm 109 is coupled to a head on the opposite side of disk 103 and to head arm mount 114.

Spindle 113 rotates, causing disks 101, 102, and 103 to rotate and imparting motion relative to heads 110, 111, and 112. Head arm mount 114 provides rotation or translation of heads 110, 111, and 112, and head arms 104, 105, 106, 107, 108, and 109. Motion of head arm mount 114 allows heads 110, 111, and 112 to be located over the desired area of disks 101, 102, and 103.

By applying a signal to heads 110, 111, and 112, information may be written to disks 101, 102, and 103. Likewise, by receiving a signal from heads 110, 111, and 112, information may be read from disks 101, 102, and 103.

Figure 2:
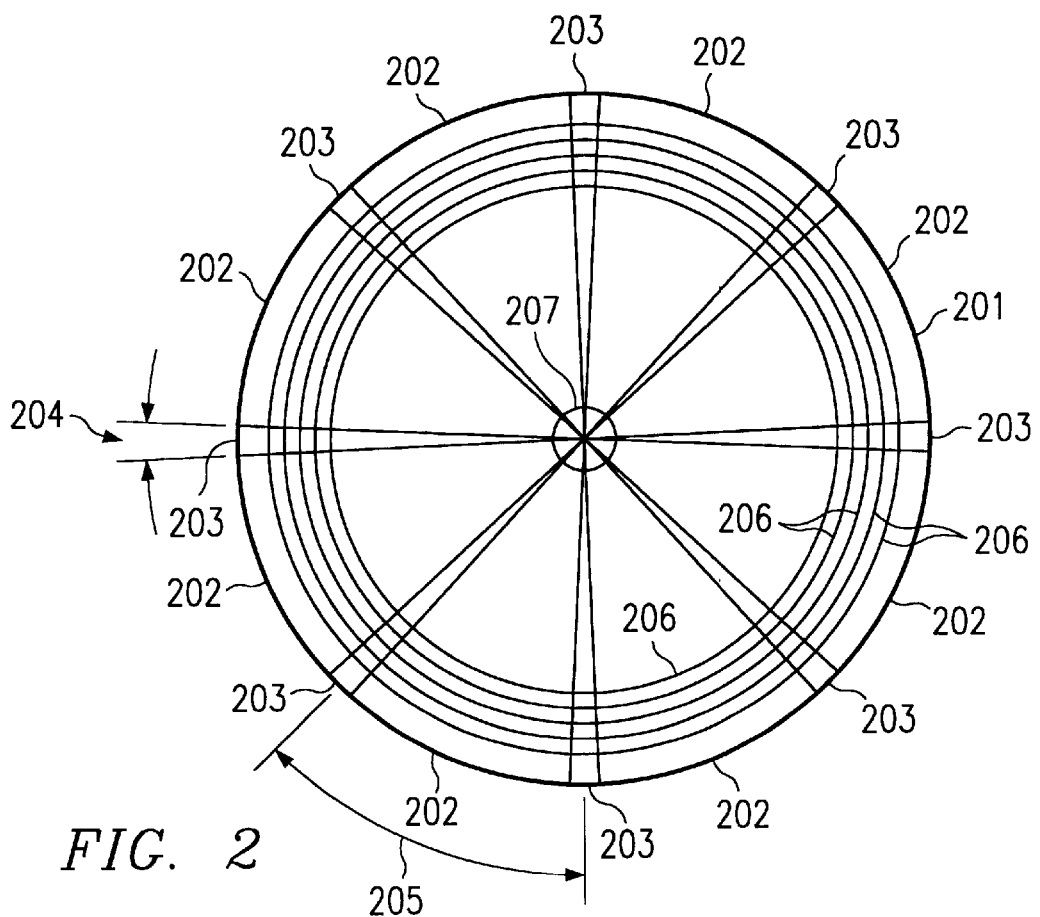
FIG. 2 is a plan view diagram illustrating a surface of a disk 201.

FIG. 2 is a plan view diagram illustrating a surface of a disk 201. The surface of the disk 201 comprises data fields 202 and servo fields 203. Groups of tracks (having the same radius) 206 are referred to as cylinders, are concentrically organized and pass through data fields 202 and servo fields 203.

Servo fields 203 are in the form of sector wedges having an angular width 204 and extending from the inner recording limit to the outer recording limit of disk 201. The servo fields occur at constant angular intervals 205 around the disk 201. Features such as data fields 202, servo fields 203, and tracks 206 need not be visibly present on the surface of a disk 201, but may be represented using information encoded on the disk 201, for example magnetically encoded in a magnetic medium on the surface of disk 201.

For the unique binary sequence (UBS) block, the two geometric properties of particular interest are the configuration of heads and the configuration of wedges. A UBS code is a sequence of bits that form a ring. The length of the ring is based on two factors, namely the number of servo frames per rotation of the disk and the number of bits of UBS code obtained from each servo frame. The number of bits from each servo frame is a fixed value for a given implementation, and is preferably either 1 or 2 or any integer (higher numbers are not normally needed). The number of servo frames per revolution may vary depending on the particular implementation. The UBS logic preferably allows for the number of servo frames to be from 30 to 128, although other ranges may also be supported.

Servo frames are radially coherent from inner to outer cylinders on all heads. The UBS code in a given servo wedge on a given head (surface) is the same, regardless of the radial position of the head (i.e. cylinder number selected). The UBS code is readable even during seek operations.

The size of the servo field is measured by a servo clock. Each servo field width is the same angular width and is a fixed portion of a rotation. Between any two servo fields is a data field. The distance between the two servos fields is a fixed angular distance and is the same for any two adjacent servo fields.

The size of the data field is measured by a read/write clock. To maximize the number of data bits stored in the data field, the read/write clock varies, depending on the physical radial position of the heads (i.e., the current cylinder number). For ease of implementation, the variance of the read/write clock is not done on a per cylinder basis, but for groups of adjacent cylinders known as zones. While the current zone number affects the amount of data that can be stored in a data field, it does not affect the size, quantity or location of the servo fields and, therefore, does not affect the operation of the UBS block.

The UBS code read by a head is unique among the UBS codes of all heads, which allows the UBS code to also verify proper head selection. Because the UBS pattern is unique by head, the UBS block must have knowledge of the currently selected head. There is a data field between each pair of servo fields.

Servo frames and data frames are related. For the purposes of a UBS block, a track should be considered as starting with data field 0, followed by servo field 0, then by data field 1 and servo field 1, data field 2, etc. If the track contains n+1 fields, data field n is followed by servo field n, which is followed by data field 0, thus closing the track. A track containing n+1 fields has field numbers from 0 to n.

Figure 3:
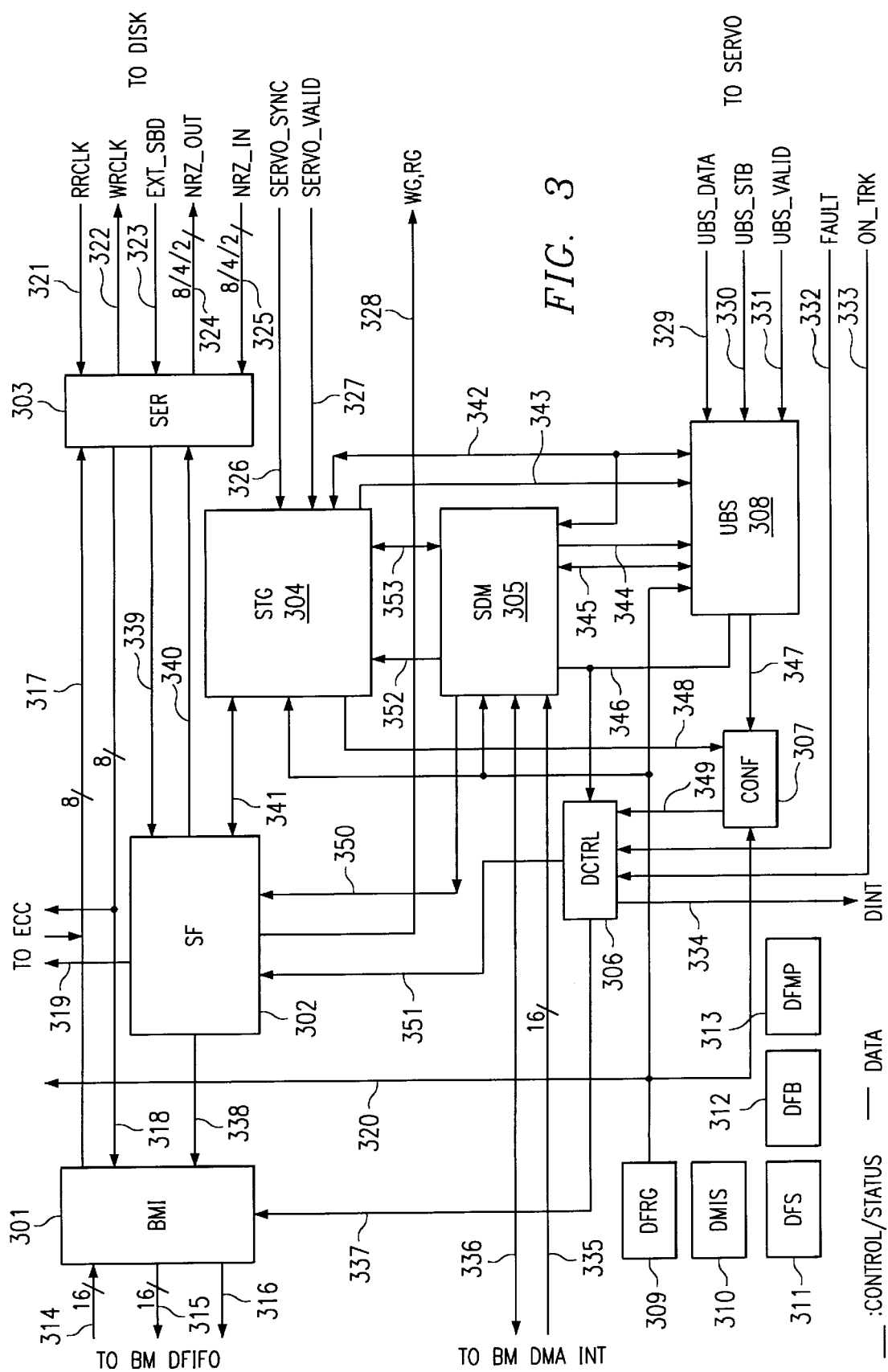
FIG. 3 is a schematic diagram illustrating a disk controller incorporating one embodiment of the present invention.

FIG. 3 is a schematic diagram illustrating a disk controller incorporating one embodiment of the present invention. The disk controller comprises buffer manager interface 301, sector formatter 302, serializer/deserializer 303, sector timing generator 304, servo direct memory access block 305, disk control block 306, confidence block 307, unique binary sequence block 308, disk formatter registers 309, disk miscellaneous block 310, disk formatter synchronization or resynchronization to system clock (SYS_CLK) block 311, disk formatter synchronization or resynchronization to byte clock BYTE_CLK block 312, and disk formatter/microprocessor interface block 313.

Buffer manager interface 301 receives data via 16-bit bus 314 from a buffer manager first in/first out (FIFO) buffer. Buffer manager interface 301 provides an output to the buffer manager FIFO buffer via 16-bit bus 315. Buffer manager interface 301 provides control signals to the buffer manager FIFO buffer via output 316. Buffer manager interface 301 provides data via 8-bit bus 317 to serializer/deserializer 303. An error correction circuit also provides data via bus 317 to serializer/deserializer 303. Serializer/deserializer 303 provides data via 8-bit bus 318 to the error correction circuit and to buffer manager interface 301. Sector formatter 302 provides signals to the error correction circuit via node 319. Sector formatter 302 provides signals to buffer manager interface 301 via node 338. Serializer/deserializer 303 provides signals to sector formatter 302 via node 339. Sector formatter 302 provides signals to serializer/deserializer 303 via node 340.

Serializer/deserializer 303 provides communication with a hard disk drive. A read reference clock signal is provided at node 321. A write reference clock signal is provided at node 322. Serializer/deserializer 303 provides a serial data stream having a non-return-to-zero (NRZ) format at output bus 324. Output bus 324 may be 8 bits wide, 4 bits wide, 2 bits wide, or some other data width. Serializer/deserializer 303 receives a serial data stream having a non-return-to-zero (NRZ) format from the hard disk drive via input bus 325. Input bus 325 may be 8 bits wide, 4 bits wide, 2 bits wide, or some other data width.

The sector timing generator receives signals relating to servo synchronization at input 326. The sector timing generator receives signals relating to the validity of servo information at input 327. The sector formatter 302 provides write gate and read gate signals at output 328.

The disk controller is also in communication with a servo circuit subsystem. The unique binary sequence block 308 receives unique binary sequence data from the servo circuit at input 329. The unique binary sequence block 308 receives a unique binary sequence strobe signal at input 330. The unique binary sequence block 308 receives a signal indicating unique binary sequence validity at input 331. Disk control block 306 receives a signal from the servo circuit indicating an externally detected fault at input 332. Disk control block 306 receives a signal from the servo circuit indicating whether the head is on track at input 333.

The disk controller is also in communication with a buffer manager DMA interface. Servo DMA block 305 sends and receives DMA signals via node 336. Servo DMA block 305 receives data from the buffer manager DMA interface via 16-bit bus 335.

Servo DMA block 305 passes data to sector timing generator 304 via bus 352. Servo DMA block 305 communicates signals to and from sector timing generator 304 via node 353. Servo DMA block 305 passes data to sector formatter 302 via bus 350. Servo DMA block 305 passes data to UBS block 308 via bus 344. Servo DMA block 305 communicates signals to and from UBS block 308 via node 345. Servo DMA block 305 and UBS block 308 communicate signals to disk control block 306 via node 346.

UBS block 308 passes data to sector timing generator 304 and servo DMA block 305 via bus 342. Sector timing generator 304 passes signals to UBS block 308 via node 343. Sector timing generator 304 passes signals to confidence block 307 via node 348. UBS block 308 passes signals to confidence block 307 via node 347. Confidence block 307 passes signals to disk control block 306 via node 349.

Disk control block 306 passes signals to buffer manager interface 301 via node 337. Disk control block 306 passes signals to sector formatter 302 via node 351. Disk control block 306 produces an interrupt signal at output 334.

Sector formatter 302 communicates signals to and from sector timing generator 304 via node 341. Disk formatter registers 309 provides signals to the error correction circuit to confidence block 307, to sector timing generator 304, to servo DMA block 305, and to UBS block 308 via node 320.

Figure 4:
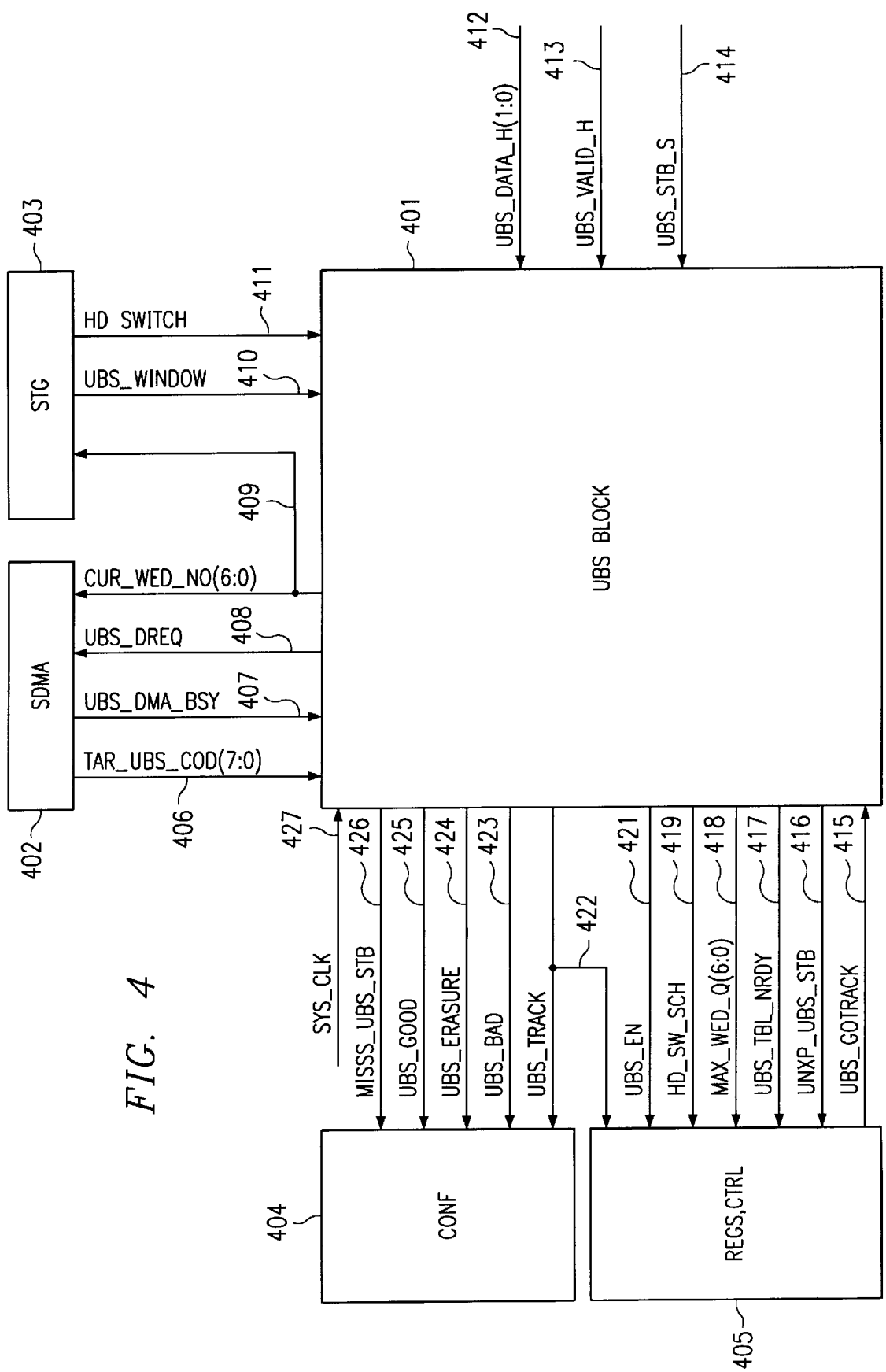
FIG. 4 is a block diagram illustrating the unique binary sequence block and blocks with which it communicates for one embodiment of the present invention.

FIG. 4 is a block diagram illustrating the unique binary sequence (UBS) block and blocks with which it communicates for one embodiment of the present invention. Unique binary sequence block 401 is in communication with servo DMA block 402. Servo DMA block 402 passes a target UBS code to UBS block 401 via bus 406. Servo DMA block 402 passes a UBS DMA busy signal to UBS block 401 via node 407. UBS block 401 passes a UBS DMA request signal to servo DMA block 402 via node 408. UBS block 401 passes a current wedge number to servo DMA block 402 and to sector timing generator 403 via bus 409. Servo timing generator 403 passes a UBS window signal to UBS block 401 via node 410. Sector timing generator 403 passes a head switch signal to UBS block 401 via node 411.

UBS block 401 is also in communication with a servo circuit. UBS block 401 receives UBS data from the servo circuit via bus 412. UBS block 401 receives a UBS validity signal from the servo circuit via node 413. UBS block 401 receives a UBS strobe signal from the servo circuit via node 414.

UBS block 401 is in communication with a confidence block 404. UBS block 401 passes a missing UBS strobe signal to confidence block 404 via node 426. UBS block 401 passes a UBS good signal to confidence block via node 425. UBS block 401 passes a UBS erasure signal to confidence block 404 via node 424. UBS block 401 passes a UBS bad signal to confidence block 404 via node 423. UBS block 401 passes UBS track information to confidence block 404 and to registers and control circuits 405 via node 422.

UBS block 401 is in communication with registers in control circuits 405. Registers and control circuits 405 pass a UBS enable signal to UBS block 401 via node 421. Registers and control circuits 405 pass UBS size information to UBS block 401 via node 420. Registers and control circuits 405 pass head switch scheduling information to UBS block 401 via node 419. Registers and control circuits 405 pass information relating to the maximum number of servo wedges to UBS block 401 via bus 418.

UBS block 401 passes information indicating whether or not a UBS table is ready to registers and control circuits 405 via node 417. UBS block 401 passes information relating to unexpected UBS strobe signals to registers and control circuits 405 via node 416. (Node 415 puts the UBS block into a special mode, used only for testing of the hardware.) UBS block 401 receives a system clock signal via clock input 427.

The unique binary sequence (UBS) block obtains and maintains continuous (or constant) rotational synchronization and verifies that the correct head has been selected. The UBS block accomplishes these functions by comparing a value obtained from each servo field with an expected UBS code. The expected UBS code recorded in the servo field is unique for each head. The UBS codes are obtained from buffer memory. The codes are fetched by the servo direct memory access (SDMA) block initiated by the UBS block.

The UBS block performs initial rotational position synchronization, maintains and monitors rotational position, validates head switches, generates the current wedge number, generates UBS table access requests and waits until the servo direct memory access (SDMA) circuit completes the access, and sends confidence information to the confidence block.

The UBS block interfaces with the STG, SDMA, CONF, DCTRL and REG blocks. The UBS block preferably does not directly utilize any disk formatter block ports that connect to other top-level blocks. The UBS block does interface with four external signals: UBS_DATA_H(1:0), UBS_VALID_H, and UBS_STB_S.

The UBS block is preferably fully synchronous. SYS_CLK is preferably the only clock used in the unique binary sequence (UBS) block and all signals in this block are preferably synchronous to SYS_CLK. Incoming signals that are not synchronized to SYS_CLK are preferably passed through the DFS block to provide synchronization before entering the UBS block. Registers are preferably clocked only by SYS_CLK and preferably not by a derived signal. All outputs from this block are preferably registered and change synchronously with the rising edge of SYS_CLK.

Figure 5:
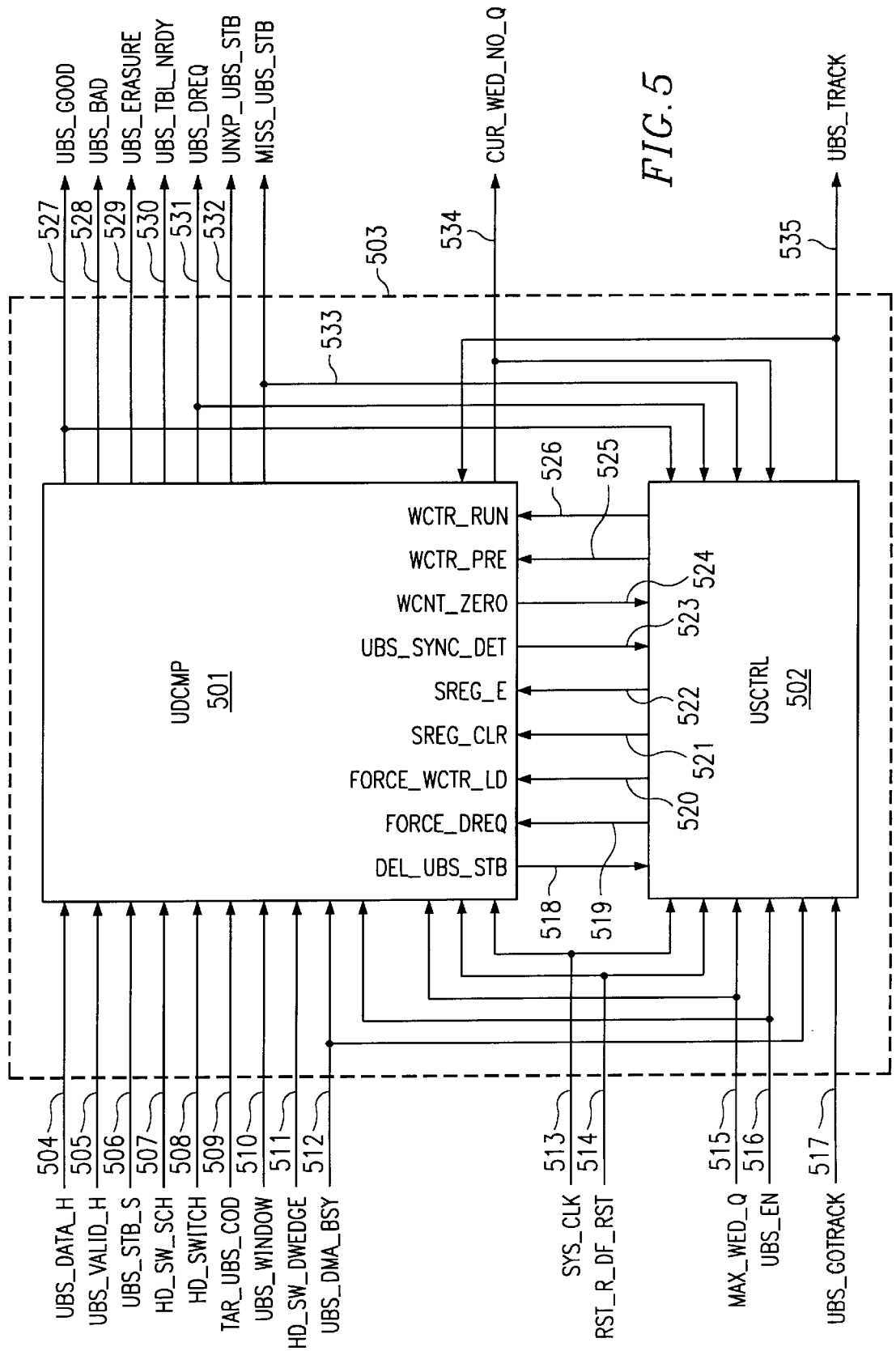
FIG. 5 is a block diagram illustrating a unique binary sequence (UBS) block according to one embodiment of the present invention.

FIG. 5 is a block diagram illustrating a unique binary sequence (UBS) block according to one embodiment of the present invention. Unique binary sequence block 503 comprises unique binary sequence control block 502 and unique binary sequence data comparator block 501. UBS data comparator block 501 receives UBS data from a servo circuit via input bus 504. UBS data comparator block 501 receives a signal providing information relating to UBS validity from a servo circuit via input 505. UBS data comparator 501 receives a UBS strobe signal from a servo circuit via input 506. UBS data comparator block 501 receives a head switch signal from registers and control circuits via input 507. UBS data comparator 501 receives a head switch signal from a sector timing generator via input 508. UBS data comparator 501 receives a target UBS code from a servo DMA block via input bus 509. UBS data comparator 501 receives a signal relating to the UBS window from a sector timing generator via input 510. UBS data comparator 501 receives a head switch servo wedge data via input bus 511. A servo DMA block applies a UBS DMA busy signal to UBS data comparator 501 and to UBS control block 502 via node 512.

A system clock signal at clock input 513 is applied to UBS data comparator block 501 and UBS control block 502. A reset signal at node 514 is applied to UBS data comparator block 501 and UBS control block 502. Registers and control circuits apply data relating to a maximum wedge value to UBS data comparator block 501 and UBS control block 502 via input bus 515. Registers and control circuits apply a UBS enable signal to UBS data comparator block 501 and UBS control block 502 via input 516. Registers and Input 517 places the UBS block into a special mode used for testing.

UBS data comparator block 501 sends a signal relating to delayed UBS strobe signals to UBS control block 502 via node 518. UBS control block 502 sends a signal to force a DMA request to UBS data comparator block 501 via node 519. UBS control block 502 sends a signal to force a wedge counter load to UBS data comparator block 501 via node 520. UBS control block 502 sends an a UBS sync detection register clear signal to UBS data comparator block 501 via node 521. UBS control block 502 sends a UBS sync detection register enable signal to UBS data comparator 501 via node 522. UBS data comparator block 501 sends a UBS synchronization detect signal to UBS control block 502 via node 523. UBS data comparator block 501 sends a wedge counter zero signal to UBS control block 502 via node 524. UBS control block 502 sends wedge counter preset data to UBS data comparator 501 via bus 525. UBS control block 502 sends a wedge counter run signal to UBS data comparator block 501 via node 526.

UBS data comparator block 501 sends a UBS_GOOD signal to UBS control block 502 and to a confidence block via output 527. UBS data comparator block 501 sends a UBS_BAD signal to a confidence block via node 528. UBS data comparator data comparator block 501 sends a UBS erasure signal to a confidence block via output 529. UBS data comparator block 501 sends a signal indicating whether a UBS table is not ready to registers and control circuits via output 530. UBS data comparator block 501 sends a UBS DMA request signal to UBS control block 502 and to a servo DMA block via output 531. UBS data comparator 501 sends an unexpected UBS strobe signal to registers and control circuits via output 532. UBS data comparator block 501 can send a missing UBS strobe signal to UBS control block 502 and to a confidence block via output 533.

UBS data comparator block 501 sends current wedge number data to UBS control block 502 and to a servo DMA block via output bus 534. UBS control block 502 sends a UBS tracking signal to UBS data comparator block 501 and to a confidence block via output 535.

The UBS block comprises a UBS data comparator (udcmp) block and a UBS control (usctrl) block. The usctrl block contains the state machine that controls the process of initially detecting UBS data stream synchronization after the UBS_EN signal is raised. The udcmp block contains the comparators that compare the incoming UBS data to the expected UBS data obtained from buffer memory and also contains a shift register structure that is used to detect initial UBS data stream synchronization. This shift register structure preferably comprises four identical sections that are defined by the usreg module.

Figure 6:
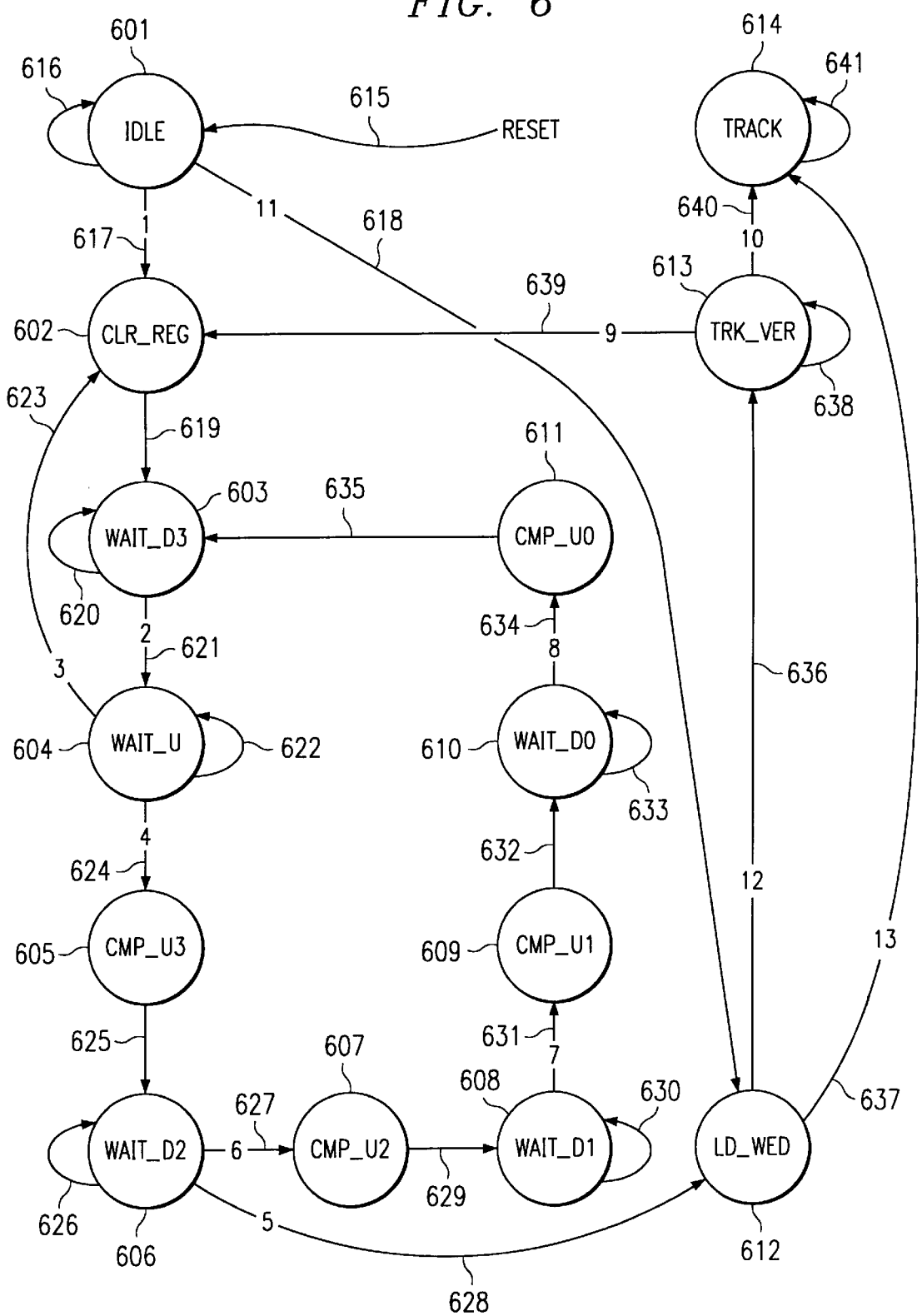
FIG. 6 is a state diagram illustrating a finite state machine implemented in the unique binary sequence control block of one embodiment of the present invention.

FIG. 6 is a state diagram illustrating a finite state machine implemented in the unique binary sequence control block of one embodiment of the present invention. Upon reset, the finite state machine takes path 615 to state 601. State 601 is an idle state. The finite state machine remains in state 601 via path 616 until conditions are satisfied for either of paths 617 or 618. The finite state machine advances to state 602 along path 617 if the UBS enable signal has a logical value of 1 and the UBS_GOTRACK signal has a logical value of zero. The finite state machine advances from 601 to state 612 along path 618 if the UBS enable signal has a logical value of one and the UBS_GOTRACK signal has a logical value of one.

In state 602, the registers are cleared and the finite state machine advances to state 603 via path 619. In state 603, the finite state machine waits for expected UBS data from buffer memory for wedges 12–15. The finite state machine remains in state 603 via path 620 until the conditions for path 621 are met. The finite state machine continues from state 603 to state 604 along path 621 when the UBS servo DMA busy signal has a logical value of zero and the UBS DMA request signal has a logical value of zero.

In state 604, the finite state machine waits for UBS data. The finite state machine remains in state 604 via path 622 until the conditions of either path 623 or path 624 are met. If the delayed UBS strobe signal has a value of one and the UBS erasure signal has a logical value of one, the finite state machine continues along path 623 to state 602. If the missing UBS strobe signal has a logical value of one, the finite state machine proceeds along path 623 to state 602. If the delayed UBS strobe signal has a logical value of one and the UBS erasure signal has a logical value of zero, the finite state machine proceeds from state 604 to state 605. In state 605, the finite state machine compares received UBS data to expected UBS data and proceeds to state 606 via path 625.

The finite state machine remains in state 606 via path 626 until the conditions of path 627 or 628 are satisfied. In state 606, the finite state machine waits for the expected UBS data from the buffer memory for wedges 8–11. When the UBS servo DMA busy signal has a logical value zero, the UBS DMA request signal has a logical value zero, and the UBS synchronization detect signal has a logical value zero, the finite state machine continues from state 606 to state 607 via path 627. When the UBS servo DMA busy signal has a logical value zero, the UBS DMA request signal has a logical value zero, and the UBS synchronization detect signal has a logical value one, the finite state machine proceeds from state 606 to state 612 along path 628.

In state 607, the finite state machine compares the received UBS data to the expected UBS data and proceeds along path 629 to state 608. The finite state machine waits for the expected UBS data from the buffer memory for wedges 4–7 in state 608. The finite state machine remains in state 608 via path 630 until the conditions of path 631 are satisfied. When the UBS servo DMA busy signal has a logical value zero and the UBS DMA request signal has a logical value zero, the finite state machine proceeds from state 608 to state 609 along path 631. In state 609, the finite state machine compares the received UBS data to the expected UBS data and continues along path 632 to state 610. In state 610, the finite state machine waits for the expected UBS data from the buffer memory for wedges 0–3. The finite state machine remains in state 610 via path 633 until the conditions of path 634 are met.

When the UBS servo DMA busy signal has a logical value of zero and the UBS DMA request signal has a logical value of zero, the finite state machine proceeds from state 610 to state 611 via path 634. In state 611, the finite state machine compares the received UBS data to the expected UBS data and proceeds along path 635 to state 603.

As stated above, if the conditions of path 618 are satisfied from state 601 or the conditions of path 628 are satisfied from state 606, the finite state machine continues in state 612. In state 612, the finite state machine loads the wedge counter. If the UBS_GOTRACK signal has a logical value zero, the finite state machine proceeds along path 636 to state 613. If the UBS_GOTRACK signal has a logical value one, the finite state machine proceeds from state 612 to state 614 via path 637.

At step 613, the finite state machine verifies that the UBS block is tracking. The finite state machine remains in state 613 via path 638 until the conditions of path 639 or path 640 are met. If the delayed UBS strobe signal has a logical value of one and the UBS good signal has a logical value of zero, the finite state machine continues from state 613 to state 602 via path 639. If the delayed UBS strobe signal has a logical value of one, the UBS good signal has a logical value of one, and the wedge counter zero signal has a logical value of one, the finite state machine proceeds along path 640 from state 613 to state 614. The finite state machine remains in state 614 via path 641. In state 614, the finite state machine maintains tracking of the UBS data on the hard disk drive.

The sync detection state machine controls the sync detection process by initiating buffer data requests for target data and enabling the four sync detection shift register stages in the proper sequence. Once the UBS block has become synchronized to the incoming UBS data stream and is tracking it, this state machine remains in its TRACK state until UBS_EN is lowered.

Figure 7:
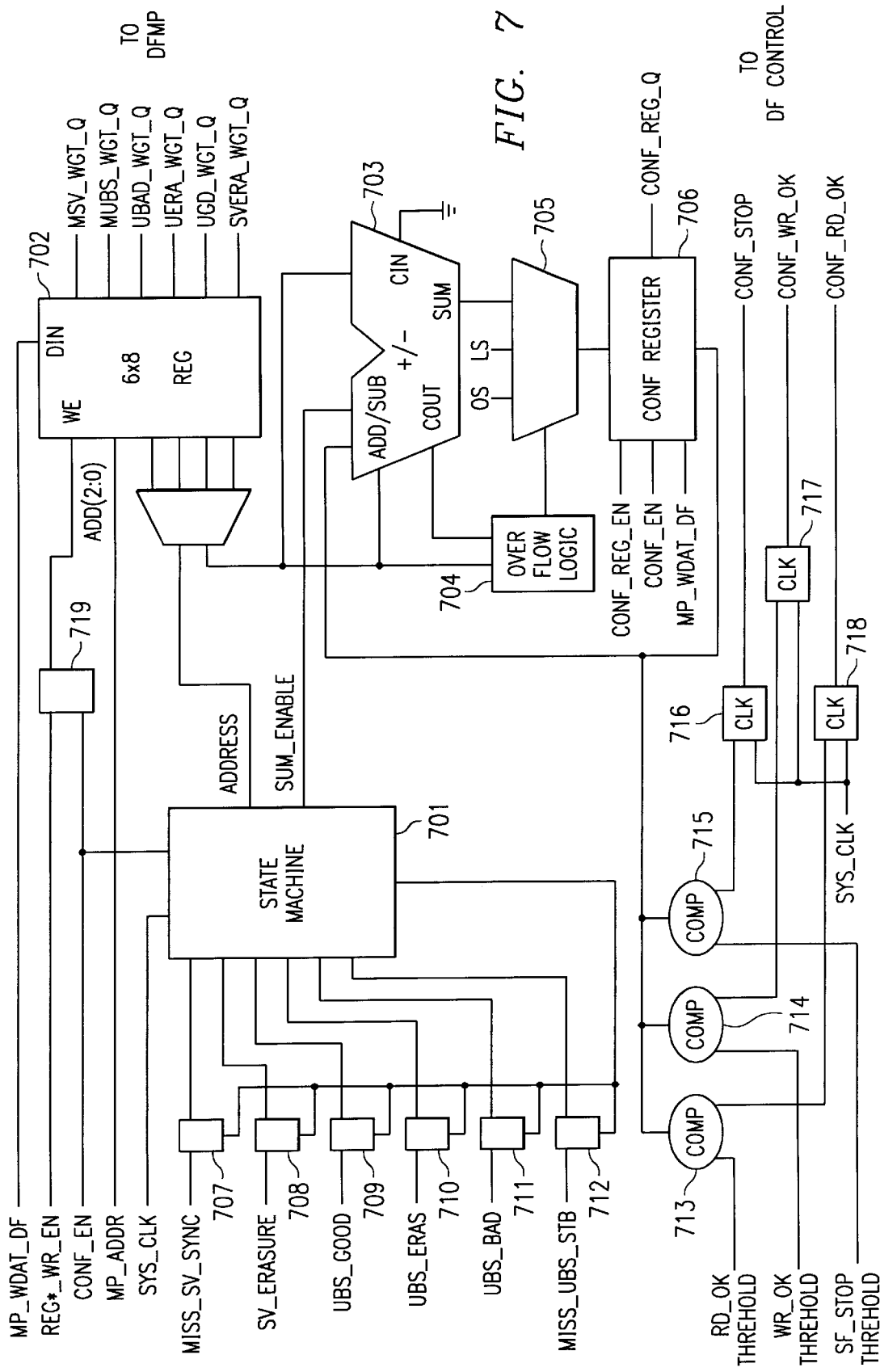
FIG. 7 is a block diagram illustrating the confidence block of one embodiment of the present invention.

FIG. 7 is a block diagram illustrating the confidence block of one embodiment of the present invention. The confidence block comprises a finite state machine 701, a random access memory (RAM) or registers 702, an adder/subtracter 703, overflow logic 704, saturation logic (multiplexer) 705, confidence register 706, D flip-flops 707–712, comparators 713–715, D flip-flops 716–718, and logic gate 719.

A missing servo sync signal is applied to the input of D flip-flop 707. The output of D flip-flop 707 is applied to an input of finite state machine 701. A servo erasure signal is applied to an input of D flip-flop 708. The output of D flip-flop 708 is applied to an input of finite state machine 701. A UBS_GOOD signal is applied to the input of D flip-flop 709. The output of D flip-flop 709 is applied to an input of finite state machine 701. A UBS erasure signal is applied to the input of D flip-flop 710. The output of D flip-flop 710 is applied to an input of finite state machine 701. A UBS_BAD signal is applied to an input of D flip-flop 711. The output of D flip-flop 711 is applied to an input of finite state machine 701. A missing UBS strobe signal is applied to an input of D flip-flop 712. The output of D flip-flop 712 is applied to an input of finite state machine 711. Finite state machine 701 provides a clock signal to the clock inputs of D flip-flops 707–712.

A system clock signal is applied to a clock input of finite state machine 701. A confidence enable signal is applied to an input of finite state machine 701 and to an input of logic gate 719. A register write enable signal is applied to an input of logic gate 719. The output of logic gate 719 is applied to a write enable input of RAM 702. A microprocessor write data disk formatter signal is applied to a data input of RAM 702.

Address information is coupled via an address bus from finite state machine 701 to registers 702. Finite state machine 701 provides a sum enable output to adder/subtracter 703. Registers 702 provide a plurality of signals to a disk formatter microprocessor interface. Registers 702 provide a data output signal to an input of adder/subtracter 703, to an addition/subtraction input of adder/subtracter 703, and to an input of overflow logic 704. The carry input of adder/subtracter 703 is coupled to ground. The carry output of adder/subtracter 703 is coupled to overflow logic 704. The sum output of adder/subtracter 703 is coupled to an input of saturation logic (multiplexer) 705. An input comprising all zeros is provided to saturation logic (multiplexer) 705. An input comprising all ones is provided to saturation logic (multiplexer) 705.

An output of overflow logic 704 is coupled to a selection input of saturation logic (multiplexer) 705. When overflow logic 704 indicates that the sum from adder/subtracter 703 is within an acceptable range, the input of saturation logic (multiplexer) 705 coupled to the sum output of adder/subtracter 703 is passed to the output of saturation logic (multiplexer) 705. If the overflow logic 704 indicates the sum from adder/subtracter 703 exceeds the maximum value of the acceptable range, the input comprising all ones is coupled to the output of saturation logic (multiplexer) 705. If overflow logic 704 indicates the sum provided by adder/subtracter 703 falls below the minimum value of the acceptable range, the input comprising all zeros is coupled to the output of saturation logic (multiplexer) 705.

The output of saturation logic (multiplexer) 705 is coupled to an input of confidence register 706. A confidence register enable input is coupled to confidence register 706. A confidence enable input is coupled to confidence register 706. A microprocessor write data signal is coupled to an input of confidence register 706. Confidence register 706 provides a confidence register output signal.

Confidence register 706 provides a signal to an input of adder/subtracter 703 and to an input of each of comparators 713, 714, and 715. A read OK threshold value is supplied to an input of comparator 713. A write OK threshold value is supplied to an input of comparator 714. A sector formatter stop threshold value is supplied to an input of comparator 715. An output of comparator 713 is coupled to an input of D flip-flop 718. D flip-flop 718 provides a confidence read OK output. An output of comparator 714 is coupled to an input of D flip-flop 717. D flip-flop 717 provides a confidence write OK output. An output of comparator 715 is coupled to an input of D flip-flop 716. D flip-flop 716 provides a confidence stop output. A system clock signal is coupled to a clock input of each of D flip-flops 716, 717 and 718. The confidence read OK, confidence write OK, and confidence stop outputs of D flip-flops 718, 717, 716 are provided to a disk formatter control block.

The disk formatter confidence (CONF) block is a confidence calculation engine that helps the disk formatter determine when it is safe to read or write. The confidence block provides user flexibility to adjust the confidence level and provides increased robustness.

The confidence logic contains a confidence value register. As events occur, the value in this register is adjusted. Good UBS codes cause the confidence to increase; other events cause the confidence to decrease. The amount of increase or decrease can be specified by the user. The user can also specify the confidence level required before reading or writing is enabled and the confidence level at which an interrupt is generated.

When the CONF block determines that it is safe to read or write, it generates a CONF_RD_OK or CONF_WR_OK signal. If the confidence level drops below the SF_STOP threshold, the confidence block generates a CONF_-SF_STOP signal to abort any read or write operation.

Preferably, all signals in the confidence block are synchronous to SYS_CLK. Any asynchronous signals are preferably synchronized to SYS_CLK in the DFS block.

Figure 8:
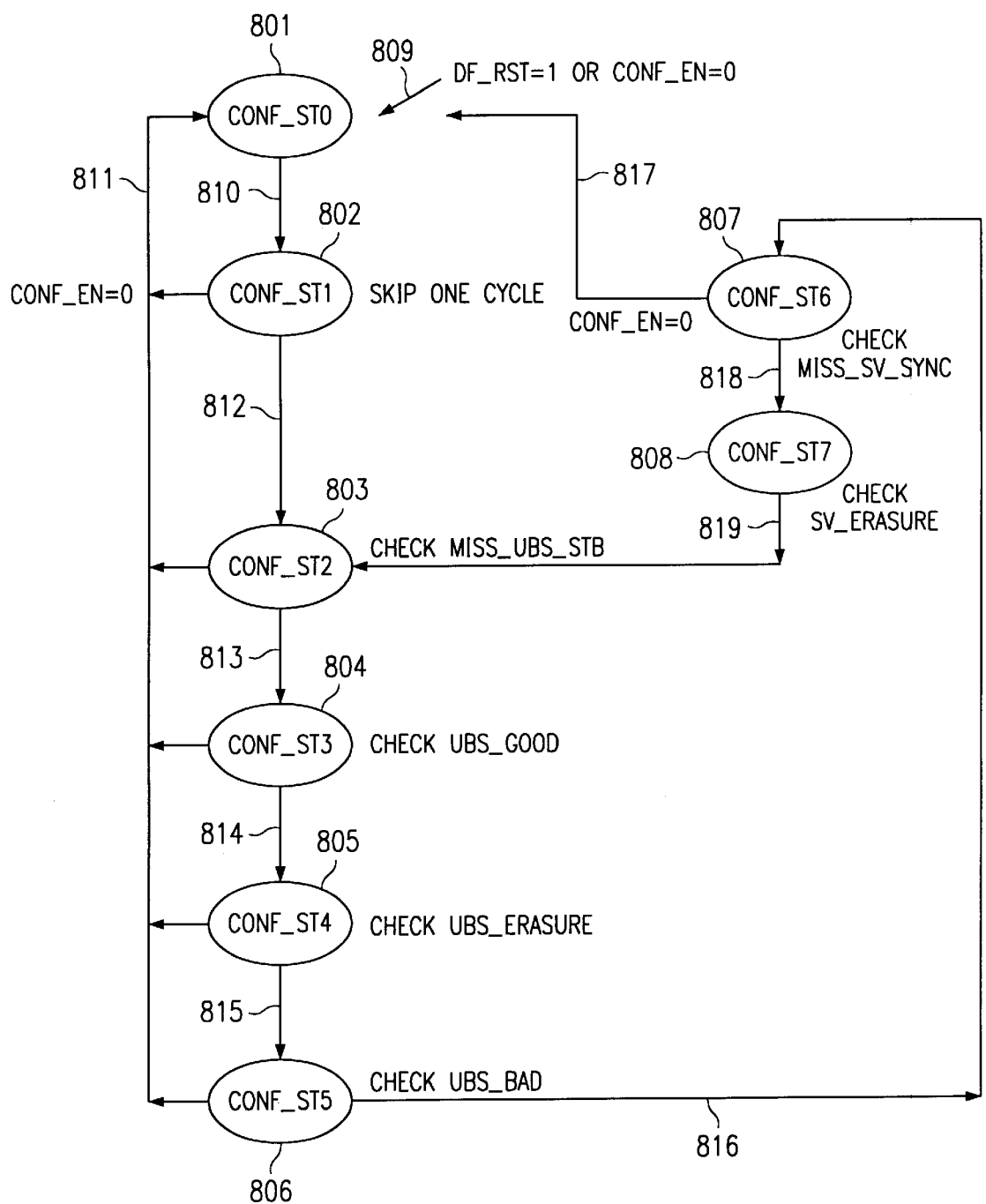
FIG. 8 is a state diagram for a confidence block finite state machine according to one embodiment of the present invention.

FIG. 8 is a state diagram for a confidence block finite state machine according to one embodiment of the present invention. The state diagram includes states 801–808 and paths 809–819. When the disk formatter is reset or the confidence block is disabled, the confidence block state machine goes to state 801 by way of path 809. From state 801, the confidence block state machine goes to state 802 by way of path of 810. In state 802, the confidence block state machine skips one cycle. The confidence block state machine goes from state 802 to state 803 by way of path 812. In state 803, the confidence block state machine checks for a missing UBS strobe. From state 803, the confidence block state machine goes to state 804 by way of path 813. In state 804, state machine checks if a good UBS code is received from the servo logic.

From state 804, the confidence block state machine goes to state 805 by way of path 814. In state 815, the confidence block state machine checks to determine if an invalid UBS code has been received from servo logic. From state 805, the confidence block state machine goes to state 806 by way of path 815. In state 816, the confidence block state machine checks whether a bad UBS code has been received from the servo logic.

From state 806, the confidence block state machine continues in state 807 by way of path 816. In state 807, the confidence block state machine checks for a missing servo sync signal. From state 807, the confidence block state machine goes to state 808 by way of path 818. In state 808, the confidence block state machine checks whether an invalid servo signal has been received from the servo logic. From state 808, the confidence block state machine goes to state 803 by way of path 819.

If the confidence block is disabled while the confidence block state machine is in any of states 802, 803, 804, 805, or 806, the confidence block state machine goes to state 801 by way of path 811. If the confidence block is disabled while the confidence block state machine is in state 807, the confidence block state machine goes to state 801 by way of path 817.

The primary function of the confidence (CONF) block is to generate the control signals RD_OK, WR_OK and STOP. To generate the proper control signals for the sector formatter (SF), the confidence (CONF) block needs the servo sync status inputs from the sector timing generator (STG), UBS strobe input, and UBS data.

Inputs to the confidence calculations include inputs with signals indicating missing or invalid servo sync; good, missing, invalid, or bad UBS code: and reset inputs.

The firmware assigns a weight to each input and writes the value to the corresponding WGT_Q register. The most significant bit of each WGT_Q register indicates whether the weight is to be added or subtracted (in one embodiment, set=addition, clear=subtraction). The remaining seven bits indicate the weight. The CONF register contains the confidence value.

The WGT_Q and the CONF register can be programmed while the CONF_EN bit is clear.

A state machine controls when to sample each input status when the CONF_EN signal is high. Each status generates an address pointing to the register location that contains a value. The state machine allows a time window for each input value to be added or subtracted to the sum. When each input is summed, the state machine generates a reset pulse to clear the input latch for the next sample. Inputs with a status of UBS_GOOD are added to the sum. Inputs with a status of MISS_SV_SYNC, UBS ERAS, UBS_BAD, and MISS_UBS_STB are subtracted from the sum. The status inputs from the UBS block are ignored until the UBS_TRACK signal becomes active.

The CONF adder/subtracter is a saturating type, meaning that the sum never goes below the minimum level or zero and never goes above the maximum value. The microprocessor can set three different threshold values for RD_OK, WR_OK, and STOP. These three thresholds should be programmed only while CONF_EN is low. As all input values are summed, the sum is compared against the thresholds. The comparison generates the proper control signals for the sector formatter (SF) through the disk controller (DCTRL) block.

The level of the thresholds, from maximum to zero, is as follows: maximum, WR_OK threshold, RD_OK threshold, stop threshold, and zero.

As an example, the maximum confidence is 3Fh (63 decimal), which can be expressed using six bits.

In one embodiment of the present invention, it is desirable to reach a maximum or minimum confidence level in 10 consecutive occurrences of any of the inputs UBS_GOOD, UBS_ERAS, UBS_BAD, or MISS_UBS_STB. The inputs have a value of 6. As a result, 10 consecutive occurrences of UBS_GOOD will bring the confidence level to the maximum. Similarly, 10 consecutive occurrences of UBS_BAD or UBS_ERAS will bring the confidence level to 0. The SF_STOP threshold can be set to 12h, the RD_OK threshold to 1Eh and the WR_OK threshold to 36h.

When CONF_EN is active after UBS_TRACK goes high, two consecutive occurrences of UBS_GOOD will bring the confidence level above SF_STOP and three more consecutive occurrences of UBS_GOOD will bring the confidence level high enough to read. However, to reach the level safe enough to write, there should be four more consecutive occurrences of UBS_GOOD. If the user wants to reach these confidence levels faster, the CONF register can be preloaded with an initial value.

Figure 9:
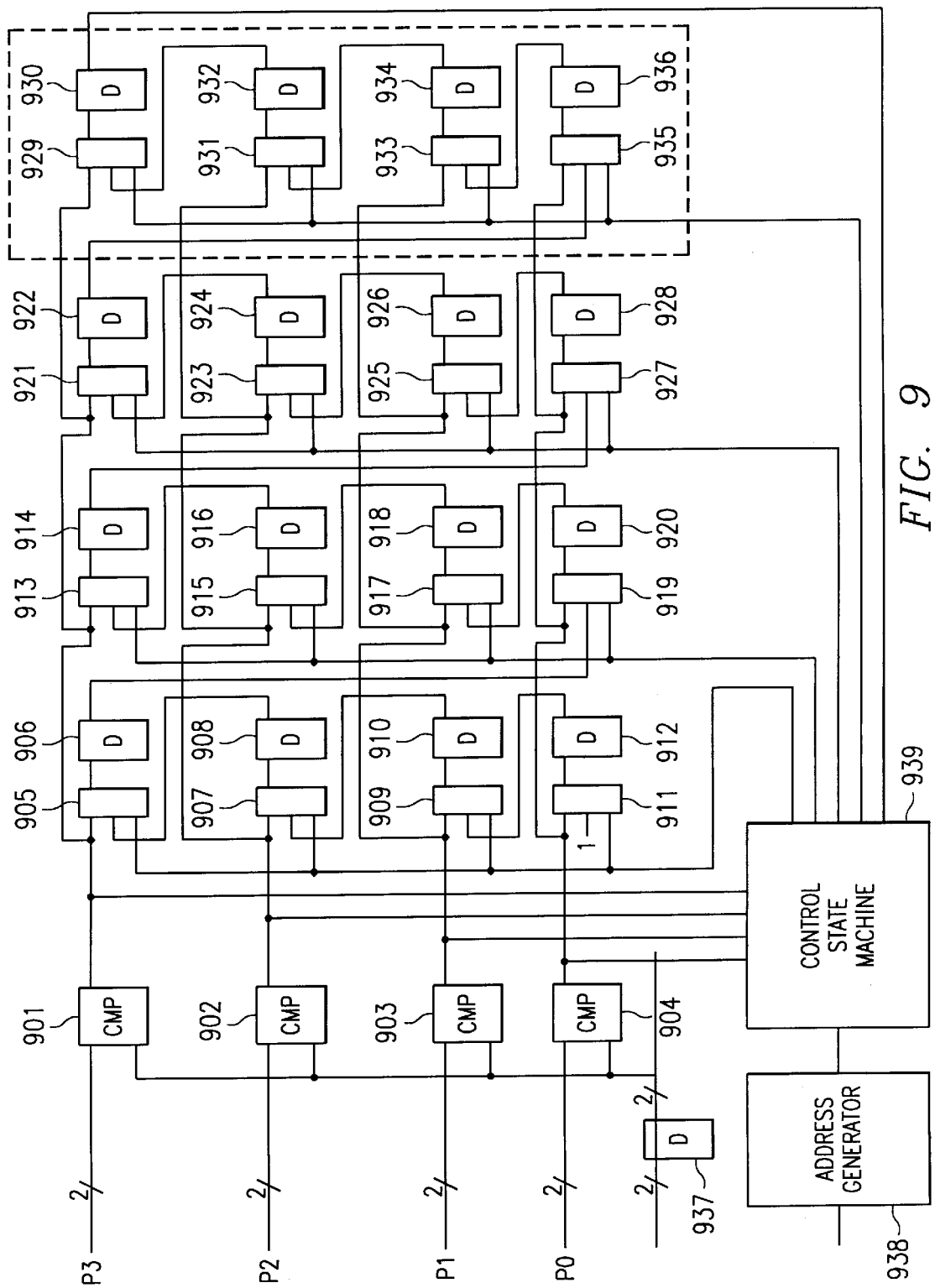
FIG. 9 is a schematic diagram illustrating a circuit for providing initial rotational synchronization detection for one embodiment of the present invention.

FIG. 9 is a schematic diagram illustrating a circuit for providing initial rotational synchronization detection for one embodiment of the present invention. A circuit includes comparators 901–904, logic gates 905, 907, 909, 911, 913, 915, 917, 919, 921, 923, 925, 927, 929, 931, 933, and 935, D flip-flops 906, 908, 910, 912, 914, 916, 918, 920, 922, 924, 926, 928, 930, 932, 934, and 936, D flip-flop 937, address generator 938, and control state machine 939.

The expected UBS data is applied via two-bit input P3 to an input of comparator 901. The expected UBS data is applied via two-bit input P2 to an input of comparator 902. The expected UBS data is applied via two-bit input P1 to an input of comparator 903. UBS data is applied via two-bit input P0 to an input of comparator 904. Received UBS data is applied via a two-bit input to D flip-flop 937. A two-bit output of D flip-flop 937 is coupled to an input of each of comparators 901, 902, 903, and 904.

An output of comparator 901 is coupled to an input of control state machine 939 and to an input of each of logic gates 905, 913, 921, and 929. An output of comparator 902 is coupled to an input of control state machine 939 and to an input of each of logic gates 907, 915, 923, and 931. An output of comparator 903 is coupled to an input of state machine 939 and to an input of each of logic gates 909, 917, 925, and 933. An output of comparator 904 is coupled to an input of control state machine 939 and to an input of each of logic gates 911, 919, 927, and 935.

An output of control state machine 939 is coupled to an input of each of logic gates 905, 907, 909, and 911. An output of control state machine 939 is coupled to an input of each of logic gates 913, 915, 917, and 919. An output of control state machine 939 is coupled to an input of each of logic gates 921, 923, 925, and 927. An output of control state machine 939 is coupled to an input of each of logic gates 929, 931, 933, and 935.

A fixed logical level 1 is coupled to an input of logic gate 911. An output of logic gate 911 is coupled to an input of D flip-flop 912. An output of D flip-flop 912 is coupled to an input of logic gate 909. An output of logic gate 909 is coupled to an input of D flip-flop 910. An output of D flip-flop 910 is coupled to an input of logic gate 907. An output of logic gate 907 is coupled to an input of D flip-flop 908. An output of D flip-flop 908 is coupled to an input of logic gate 905. An output of logic gate 905 is coupled to an input of D flip-flop 906.

An output of D flip-flop 906 is coupled to an input of logic gate 919. An output of logic gate 919 is coupled to an input of D flip-flop 920. An output of D flip-flop 920 is coupled to an input of logic gate 917. An output of logic gate 917 is coupled to an input of D flip-flop 918. An output of ID flip-flop 918 is coupled to an input of logic gate 915. An output of logic gate 915 is coupled to an input of D flip-flop 916. An output of D flip-flop 916 is coupled to an input of logic gate 913. An output of logic gate 913 is coupled to an input of D flip-flop 914.

An output of D flip-flop 914 is coupled to an input of logic gate 927. An output of logic gate 927 is coupled to an input of D flip-flop 928. An output of D flip-flop 928 is coupled to an input of logic gate 925. An output of logic gate 925 is coupled to an input of D flip-flop 926. An output of D flip-flop 926 is coupled to an input of logic gate 923. An output of logic gate 923 is coupled to an input of D flip-flop 924. An output of D flip-flop 924 is coupled to an input of logic gate 921. An output of logic gate 921 is coupled to an input of D flip-flop 922.

An output of D flip-flop 922 is coupled to an input of logic gate 935. An output of logic gate 935 is coupled to an input of D flip-flop 936. An output of D flip-flop 936 is coupled to an input of logic gate 933. An output of logic gate 933 is coupled to an input of D flip-flop 934. An output of D flip-flop 934 is coupled to an input of logic gate 931. An output of logic gate 931 is coupled to an input of D flip-flop 932. An output of D flip-flop 932 is coupled to an input of logic gate 929. An output of logic gate 929 is coupled to an input of D flip-flop 930. An output of D flip-flop 930 is coupled an input of control state machine 939. Control state machine 939 is coupled to address generator 938.

The UBS block can be in one of the three following states: disabled, searching, and tracking. If the UBS_EN signal is low, the UBS block is held in the disabled state. Because the REG block negates the UBS_EN signal during power-on reset, the UBS block powers up in the disabled state. Once the microprocessor determines that it is time for the UBS block to acquire rotational synchronization, it sets the UBS_EN bit, which changes the UBS state to the searching state. The searching state is maintained until the UBS block determines an initial rotational position and then continues to maintain rotational position for at least one revolution of the disk. Before setting the UBS_EN bit, the microprocessor sets up the UBS table in the buffer memory, sets the Expected Head register to the desired head, and commands the read/write channel to operate from the specified head.

The search process divided into two phases. These phases are the initial acquisition phase and tracking verification phase. The UBS logic begins initial acquisition by processing UBS bits received from the servo timing logic. The UBS block looks at the pattern from 16 consecutive servo frames and compares these to the value expected for the first 16 servo frames. If the pattern does not match, the UBS value from the first (oldest) servo frame is discarded, the remaining values are shifted down and a new UBS value is received. This new 16-frame pattern is compared to the expected values. This process is repeated until a match occurs or the microprocessor stops the search operation.

When a match occurs, the UBS logic sets the current wedge number to 16 and switches from initial acquisition mode to tracking verification mode. The UBS logic then continues to track the UBS codes from the servo frames until the wedge number reaches the maximum wedge number and then rolls over to zero. At this point, all the servo frames for the track have been read and compared. If all the UBS values compared to their expected value, the UBS block switches to the tracking state. If a UBS bit did not compare successfully or the servo timing logic indicates that the UBS data was not valid or there is a UBS framing error, the UBS block returns to the initial acquisition mode and begins the acquisition process again.

Once the UBS block is tracking, it advances the wedge counter after each servo wedge and compares the incoming UBS data for each wedge to the expected UBS data values. The wedge numbering scheme of the UBS block of one embodiment of the present invention assumes that the sector data area for each wedge occurs before the servo information for that wedge. When the UBS_STB_S input is high, the UBS block compares the incoming UBS data that is present on the UBS_DATA_H bus and UBS_VALID_H bus to the expected UBS data that is present on the TAR_UBS_COD bus. The results of this comparison are made available to the confidence block during the next SYS_CLK cycle. After the UBS_STB_S pulse, the UBS block advances the wedge counter and then fetches more expected UBS data through the SDMA block if necessary.

During head switches, the wedge counter is reset to the wedge number of the first servo wedge that is to be processed on the new surface. The sector timing generator is responsible for adjusting the size and position of the servo sync and UBS strobe windows during head switches, but the UBS block is responsible for adjusting the wedge number.

The wedge number of the first valid wedge encountered after a head switch may differ from the previous wedge number by 0, +1 or +2. Because the UBS block increments the wedge number immediately after processing a wedge, it will already have adjusted the previous wedge number by +1 when the head switching time arrives. Thus, during the head switch, the UBS block must modify the current wedge number by −1, 0 or +1 to produce a net change of 0, +1 or +2, respectively.

Figure 10:
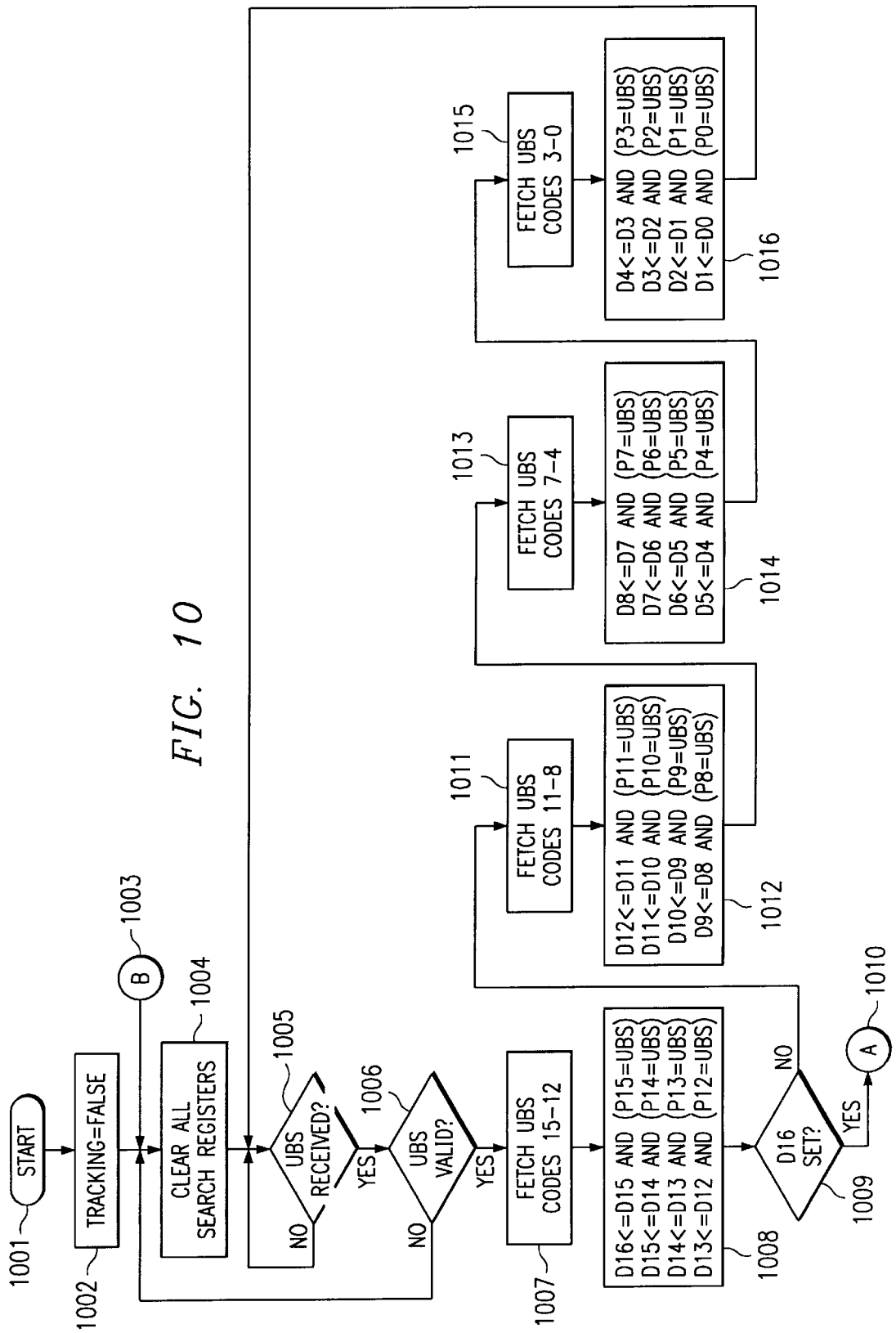
FIG. 10 is a flow chart illustrating a process for initial acquisition of position information according to one embodiment of the present invention.

FIG. 10 is a flow chart illustrating a process for initial acquisition of position information according to one embodiment of the present invention. The process begins in step 1001 and continues to step 1002. In step 1002, a tracking parameter is set to have a value of false. From step 1002, the process continues in step 1004. Alternatively, the process may begin in step 1003 and continue to step 1004. In step 1004, the process clears all search registers.

From step 1004, the process continues to step 1005. Step 1005 is a decision block in which a decision is made as to whether a unique binary sequence has been received. If a unique binary sequence has not been received, the process continues with step 1005. However, if a unique binary sequence has been received, the process continues with step 1006. Step 1006 is a decision block where a decision is made as to whether the received unique binary sequence is valid. If the received unique binary sequence is not valid, the process continues at step 1004. However, if the received unique binary sequence is valid, the process continues at step 1007.

In step 1007, the process fetches the expected unique binary sequence codes for wedges 15 through 12. From step 1007, the process continues in step 1008. In step 1008, the process sets data bit D16 to be equal to the logical AND of data bit D15 and the result of a comparison between the received UBS data and the expected UBS data for wedge 15. The process sets data bit D15 to be equal to the logical AND of data bit D14 and the result of a comparison between the received UBS data and the expected UBS data for wedge 14. The process sets data bit D14 to be equal to the logical AND of data bit D13 and the result of a comparison between the received UBS data and the expected UBS data for wedge 13. The process sets data bit D13 to be equal to the logical AND of data bit D12 and the result of a comparison between the received UBS data and the expected UBS data for wedge 12.

From step 1008, the process continues in step 1009. Step 1009 is a decision block where a decision is made as to whether data bit D16 is set. If data bit D16 is set, the process concludes in step 1010. If data bit D16 is not set, the process continues in step 1011. In step 1011, the process fetches expected UBS codes for wedges 11 through 8. From step 1011, the process continues to step 1012.

In step 1012, the process sets data bit D12 to be equal to the logical AND of data bit D11 and the result of a comparison between the received UBS data and the expected UBS data for wedge 11. The process sets data bit D11 to be equal to the logical AND of data bit D10 and the result of a comparison between the received UBS data and the expected UBS data for wedge 10. The process sets data bit D10 to be equal to the logical AND of data bit D9 and the result of a comparison between the received UBS data and the expected UBS data for wedge 9. The process sets data bit D9 to be equal to the logical AND of data bit D8 and the result of a comparison between the received UBS data and the expected UBS data for wedge 8.

From step 1012, the process continues in step 1013. In step 1013, the process fetches the expected UBS codes for wedges 7 through 4. From step 1013, the process continues in step 1014.

In step 1014, the process sets data bit D8 to be equal to the logical AND of data bit D7 and the result of a comparison between the received UBS data and the expected UBS data for wedge 7. The process sets data bit D7 to be equal to the logical AND of data bit D6 and the result of a comparison between the received UBS data and the expected UBS data for wedge 6. The process sets data bit D6 to be equal to the logical AND of data bit D5 and the result of a comparison between the received UBS data and the expected UBS data for wedge 5. The process sets data bit D5 to be equal to the logical AND of data bit D4 and the result of a comparison between the received UBS data and the expected UBS data for wedge 4.

From step 1014, the process continues in step 1015. In step 1015, the process fetches the expected UBS codes for wedges 3 through 0. From step 1015, the process continues in step 1016.

In step 1016, the process sets data bit D4 to be equal to the logical AND of data bit D3 and the result of a comparison between the received UBS data and the expected UBS data for wedge 3. The process sets data bit D3 to be equal to the logical AND of data bit D2 and the result of a comparison between the received UBS data and the expected UBS data for wedge 2. The process sets data bit D2 to be equal to the logical AND of data bit D1 and the result of a comparison between the received UBS data and the expected UBS data for wedge 1. The process sets data bit D1 to be equal to and the result of a comparison between the received UBS data and the expected UBS data for wedge 0. From step 1016, the process continues at step 1005.

Figure 11:
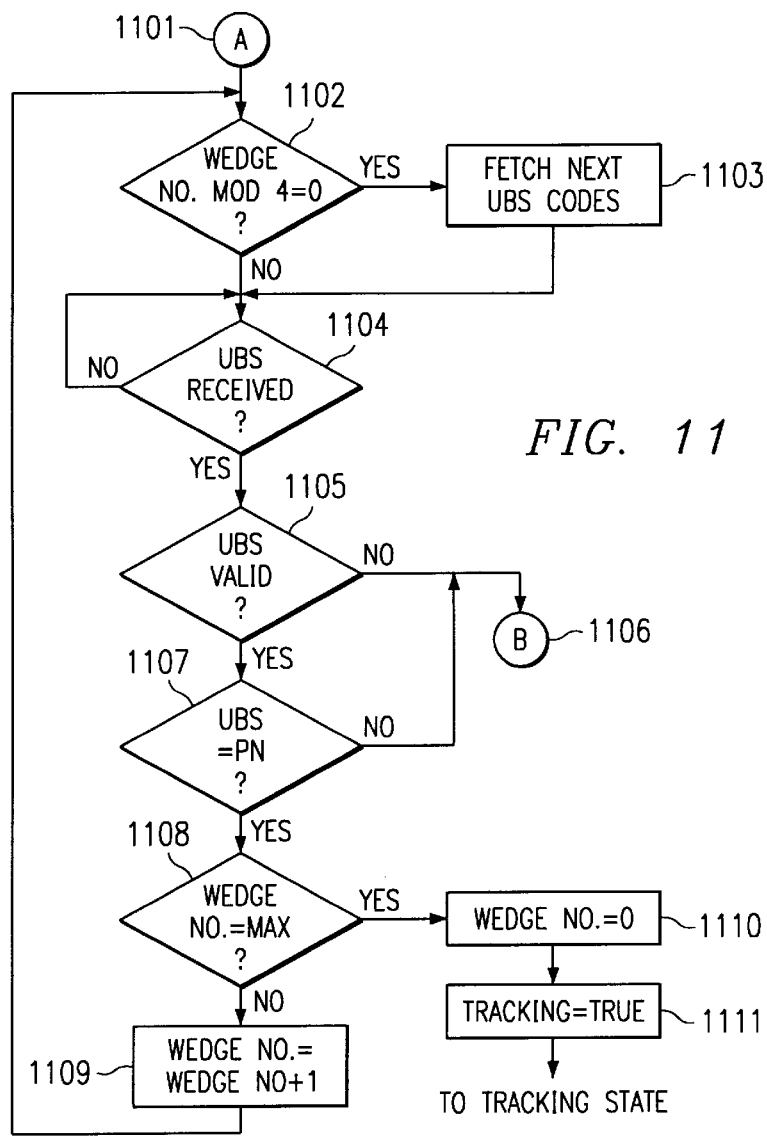
FIG. 11 is a flow diagram illustrating a process by which tracking verification may be performed in one embodiment of the present invention.

FIG. 11 is a flow diagram illustrating a process by which tracking verification may be performed in one embodiment of the present invention. The process begins in step 1101. In one embodiment, step 1101 may follow step 1010 of the process illustrated in FIG. 10. From step 1101, the process continues to step 1102. Step 1102 is a decision block in which a decision is made as to whether the wedge number modulo 4 is equal to zero. If the wedge number modulo 4 is equal to zero, the process continues from step 1102 to step 1103. In step 1103, the process fetches the next unique binary sequence codes. From step 1103, the process continues to step 1104. If, in step 1102, the wedge number modulo 4 is not equal to zero, the process continues in step 1104.

Step 1104 is a decision block in which a decision is made as to whether the unique binary sequence code had been received. If no unique binary sequence code has been received the process continues in step 1104. If, however, a unique binary sequence code has been received, the process continues in step 1105. Step 1105 is a decision block in which a decision is made as to whether the unique binary sequence code is valid. If the unique binary sequence code is not valid, the process continues to step 1106. However, if the unique binary sequence code is valid, the process continues in step 1107. Step 1107 is a decision block in which a decision is made as to whether the unique binary sequence code equals a value $P_N$. If the unique binary sequence code does not equal the value $P_N$, the process continues in step 1106. From step 1106, in one embodiment, the process may continue in step 1003 of the process illustrated in FIG. 10. However, if the unique binary sequence code equals the value $P_N$, the process continues in step 1108.

Step 1108 is a decision block in which a decision is made as to whether the wedge number equals a maximum value. If the wedge number does not equal the maximum value, the process continues in step 1109. In step 1109, the wedge number is incremented by one. From step 1109, the process continues in step 1102.

In step 1108, if the wedge number is equal to the maximum value, the process continues in step 1110. In step 1110, the wedge number is set to a value of zero. From step 1110, the process continues to step 1111. In step 1111, the tracking parameter is set to have a value of true. From step 1111, the process continues to a tracking state.

Figure 12:
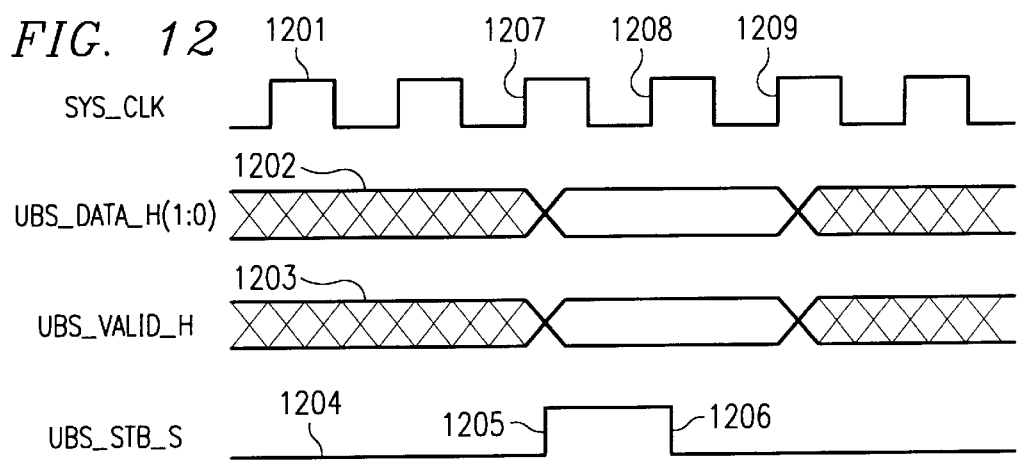
FIG. 12 is a timing diagram illustrating timing relationships between the system clock signal, the UBS data, the UBS validity signal, and the UBS strobe signal according to one embodiment of the present invention.

FIG. 12 is a timing diagram illustrating timing relationships between the system clock signal, the UBS data, the UBS validity signal, and the UBS strobe signal according to one embodiment of the present invention. The timing of the system clock signal is illustrated by waveform 1201. The timing of the UBS data is illustrated by waveform 1202. The timing of the UBS validity signal is illustrated by waveform 1203. The timing of the UBS strobe signal is illustrated by waveform 1204.

The UBS strobe signal illustrated in waveform 1204 initially has a low logic level. At transition 1205, the UBS strobe signal changes from a low logic level to a high logic level. Transition 1205 is occurs shortly after transition 1207. Transition 1207 is a low to high transition of the system clock signal. Prior to transition 1207, UBS data illustrated in waveform 1202 and the UBS validity signal illustrated in waveform 1203 may be at a high logic level, a low logic level, or may be transitioning between logic levels. Following transition 1207, UBS data and the UBS validity signal settle to their appropriate logic levels and remain at those levels at least until transition 1209. Transition 1209 is a low to high transition of the system clock signal that appears two clock cycles after transition 1207.

The UBS strobe signal illustrated in waveform 1204 changes from a high logic level to a low logic level at transition 1206. Transition 1206 occurs shortly after transition 1208. Transition 1208 is a low to high transition of the system clock signal that occurs one cycle after transition 1207. At transition 1208, the UBS data and UBS validity signal are read and their values are stored.

Figure 13:
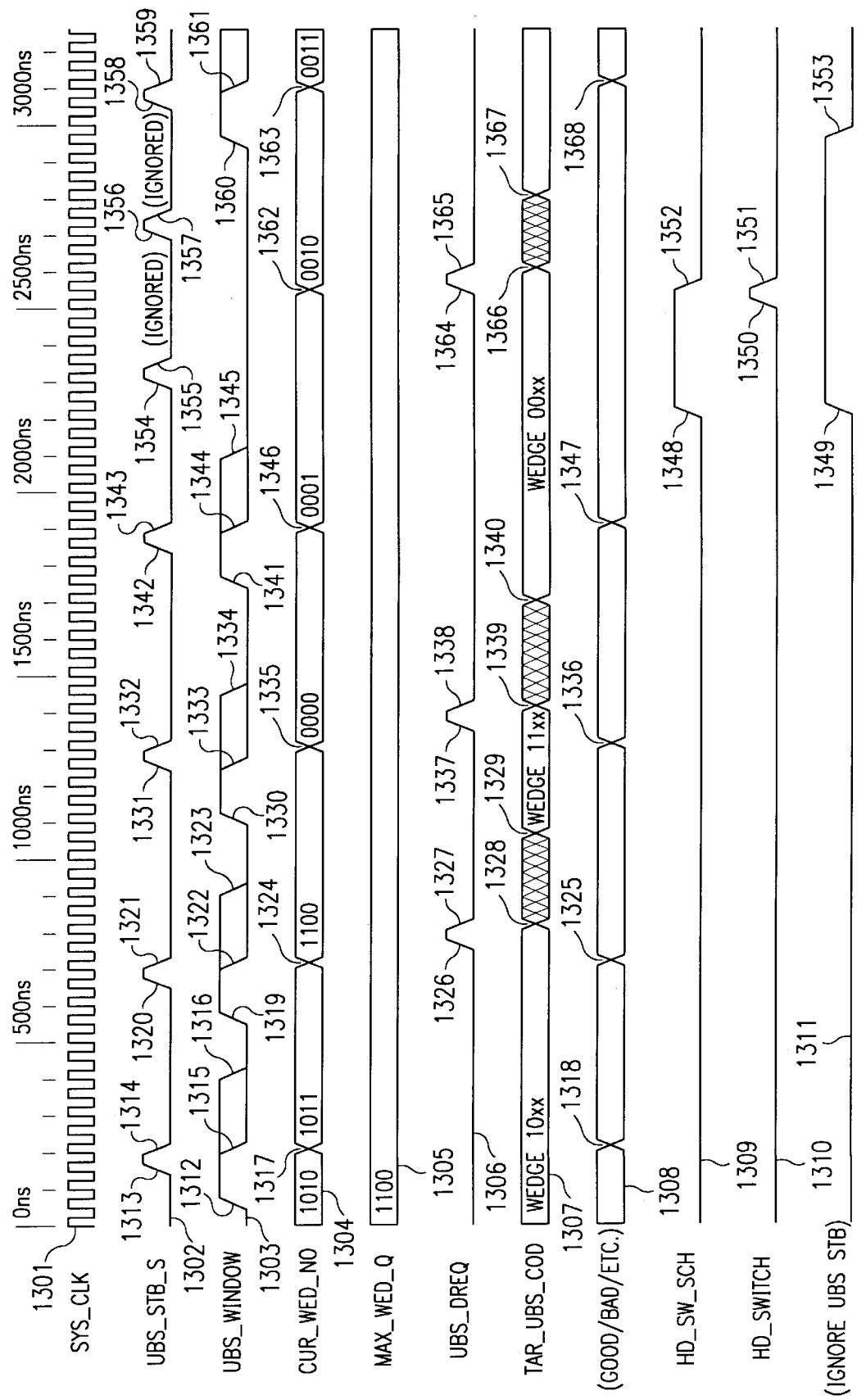
FIG. 13 is a timing diagram illustrating the timing of signals relating to the current wedge number of one embodiment of the present invention.

FIG. 13 is a timing diagram illustrating the timing of signals relating to the current wedge number or one embodiment of the present invention. The time values above the diagram are for reference only and do not necessarily reflect accurate timings. Also, the wedge numbers in this diagram have been shortened for simplicity. The timing of a system clock signal is illustrated in waveform 1301. The timing of a UBS strobe signal is illustrated in waveform 1302. The timing of a UBS window signal is illustrated in waveform 1303. The timing of current wedge number data is illustrated in waveform 1304. The timing of maximum wedge output data is illustrated in waveform 1305. The timing of a UBS DMA request signal is illustrated in waveform 1306. The timing of target UBS code data is illustrated in waveform 1307. The timing of other signals, for example a UBS_GOOD signal, a UBS_BAD signal, or another signal, is illustrated in waveform 1308. The timing of a signal that indicates that head switching is scheduled is illustrated in waveform 1309. The timing of a signal that indicates that head switching has occurred is illustrated in waveform 1310. The timing of a signal that indicates that the UBS strobe signal should be ignored is illustrated in waveform 1311, which is provided to illustrate this concept.

At transition 1312, the UBS window signal transitions from a low logic level to a high logic level. The UBS window signal defines a window during which UBS data may be made available. At transition 1313, the UBS strobe signal illustrated in waveform 1302 transitions from a low logic level to a high logic level. At transition 1314, the UBS strobe signal transitions from a high logic level to a low logic level. At transition 1315, at transition 1316, or somewhere between transitions 1315 and 1316, the UBS window signal transitions from a high logic level to a low logic level. At transition 1317, the current wedge number changes. Prior to transition 1317, the current wedge number in this example is illustrated as 1010 in binary notation. Following transition 1317, the current wedge number is illustrated as 1011 in binary notation. Transition 1318 occurs substantially simultaneously with transition 1317 and indicates that other signals, such as UBS_GOOD, UBS BAD, or another signal, change substantially simultaneously with the change of the current wedge number indicated by transition 1317. While these events are occurring, the maximum wedge output data remains at a value of 1100 in binary notation. The UBS DMA request signal illustrated in waveform 1306, the head switch scheduled signal illustrated in waveform 1309, the head switch occurred signal illustrated in waveform 1310, and the ignore UBS strobe signal illustrated in waveform 1311 all remain at a low logic level during the time the previously described events occur. In fact, for this embodiment of the present invention, the maximum wedge output data remains at a value of 1100 in binary notation for the duration of this example.

At transition 1319, the UBS window signal changes from a low logic level to a high logic level. At transition 1320, the UBS strobe signal changes from a low logic level to a high logic level. At transition 1321, the UBS strobe signal changes from a high logic level to a low logic level. At transition 1322, at transition 1323, or at some time between transitions 1322 and 1323, the UBS window signal changes from a high logic level to a low logic level. At transition 1324, which occurs substantially simultaneously with transition 1321, the current wedge number data changes from 1011 to 1100 in binary notation. Transition 1325, which represents the timing of a change of signals such as the UBS_GOOD signal or the UBS_BAD signal, occurs substantially simultaneously with transition 1324.

Transition 1326 represents a transition of the UBS DMA request signal from a low logic level to a high logic level. Transition 1327 represents a transition of the UBS DMA request signal from a high logic level to a low logic level. The target UBS code data may begin to change at transition 1328, which is substantially simultaneous with transition 1327. The change of the target UBS code data is completed at or before transition 1329. In this example, the target UBS code data has a value of 10xx in binary notation, where x represents a bit that may have a binary value of 0 or 1. Following transition 1329, the target UBS code data has a value of 11xx in binary notation.

At transition 1330, the UBS window signal changes from a low logic level to a high logic level. At transition 1331, the UBS strobe signal changes from a low logic level to a high logic level. At transition 1332, the UBS strobe signal changes from a high logic level to a low logic level. At transition 1333, at transition 1334, or somewhere between transitions 1333 and 1334, the UBS window signal changes from a high logic level to a low logic level. At transition 1335, which occurs substantially simultaneously with transition 1332, the current wedge number data changes from 1100 to 0000 in binary notation. This change represents a change from the maximum wedge value of 1100 in this example to the minimum wedge value of 0000 in this example. Transition 1336, which represents a transition of signals such as UBS_GOOD or UBS_BAD, occurs substantially simultaneously with transition 1335.

At transition 1337, the UBS DMA request signal changes from a low logic level to a high logic level. At transition 1338, the UBS DMA request signal changes from a high logic level to a low logic level. Transition 1339 is substantially simultaneous with transition 1338. The target UBS code data changes at or after transition 1339 and at or before transition 1340. Before transition 1339, the target UBS code data has a value of 11xx in binary notation. After transition 1340, the target UBS code data has a value of 00xx in binary notation.

At transition 1341, the UBS window signal changes from a low logic level to a high logic level. At transition 1342, the UBS strobe signal changes from a low logic level to a high logic level. At transition 1343, the UBS strobe signal changes from a high logic level to a low logic level. At transition 1344, at transition 1345, or somewhere between transitions 1344 and 1345, the UBS window signal changes from a high logic level to a low logic level. At transition 1346, which is substantially simultaneous with transition 1343, the current wedge number data changes from 0000 to 0001 in binary notation. At transition 1347, which is substantially simultaneous with transition 1346, the other signals, for example UBS_GOOD and UBS_BAD signals, may change.

At transition 1348, the head switch scheduled signal illustrated in waveform 1309 changes from a low logic level to a high logic level. At transition 1349, which is substantially simultaneous with transition 1348, an ignore UBS strobe signal changes from a low logic level to a high logic level. At transition 1350, a head switch occurred signal illustrated in waveform 1310 changes from a low logic level to a high logic level. At transition 1351, the head switch occurred signal changes from a high logic level to a low logic level. At transition 1352, the head switch scheduled signal changes from a high logic level to a low logic level. The UBS strobe signal makes a low to high change at transition 1354 and a high to low change at transition 1355, as well as another low to high change at transition 1356 and a high to low change at transition 1357. Since transitions 1354, 1355, 1356, and 1357 occur while the ignore UBS strobe signal illustrated in waveform 1311 has a high logic level, these transitions are ignored.

At transition 1362, the current wedge number changes from 0001 to 0010 in binary notation. At transition 1364, the UBS DMA request signal changes from a low logic level to a high logic level. At transition 1365, the UBS DMA signal changes from a high logic level to a low logic level. At transition 1366, at transition 1367, or somewhere between transitions 1366 and 1367, the target UBS code data may change.

At transition 1353, the ignore UBS strobe signal changes from a high logic level to a low logic level. Plus, UBS strobe signals following transition 1353 will not be ignored. At transition 1360, the UBS window signal changes from a low logic level to a high logic level. At transition 1358, the UBS strobe signal changes from a low logic level to a high logic level. At transition 1359, the UBS strobe signal changes from a high logic level to a low logic level. At or after transition 1361, the UBS window signal changes from a high logic level to a low logic level. At transition 1363, which is substantially simultaneous with transition 1359, the current wedge number changes from 0010 to 0011 in binary notation. At transition 1368, which is substantially simultaneous with transition 1363, other signals, for example a UBS_GOOD signal or a UBS_BAD signal, may change.

The illustrated example assumes that the maximum wedge number for one embodiment of the present invention is 12. Other values may be used for other embodiments. The UBS strobe advances the wedge number from $10_{10}$ to $11_{10}$ near the 200 ns line, and then advances to $12_{10}$ near the 700 ns line. The UBS block requests a new byte of target UBS data from the SDMA block at that time because the least significant bits of the wedge number have rolled over from $11_2$ to $00_2$. The next UBS strobe changes the wedge number from $12_{10}$ to $0_{10}$, because the maximum wedge number is $12_{10}$. The UBS block requests another byte of target UBS data at that time because the wedge number has rolled over from the maximum wedge number to zero. The HD_SW_SCH signal rises near 2200 ns, causing the UBS block to begin ignoring UBS strobe pulses. Near 2500 ns, the HD_SWITCH pulse causes the UBS block to adjust the wedge number (by +1 in this case, for a net adjustment of +2 between valid wedges) and forces it to request a new byte of target UBS data from the SDMA block. The UBS block continues to ignore UBS strobe pulses until the UBS window time arrives and then it resumes normal operation.

Note that at preferably any time except during head switches, the UBS block signals an error condition if a UBS strobe pulse arrives outside the UBS window. Also note that the UBS block preferably prematurely closes the UBS window after it receives a valid UBS strobe pulse so that it can signal an error condition if it gets a second pulse during the UBS window.

Thus, a method and apparatus for providing position detection using a unique binary sequence encoded in indexing bits stored in servo wedges has been provided.

We claim:

1. A method for determining position information for a disk drive comprising the steps of:

reading a plurality of bits from a plurality of servo wedges;

performing a first comparison of said plurality of bits to a known sequence of bits;

determining said position information from said comparison;

reading one or more bits from a servo wedge;

performing a second comparison of said one or more bits to said known sequence of bits; and adjusting a confidence level based on said comparison.

2. The method of claim 1 further comprising the step of:

inhibiting writing of data to said disk drive if said confidence level falls below a first threshold.

3. The method of claim 2 further comprising the step of:

inhibiting reading of data from said disk drive if said confidence level falls below a second threshold.

4. The method of claim 3 further comprising the step of:

causing an initial position detection process to be performed if said confidence level falls below a third threshold.

5. The method of claim 1 further comprising the step of:

initiating said step of reading one or more bits from said servo wedge upon switching from a first head of said disk drive to a second head of said disk drive.

6. Apparatus for determining position information in a disk drive comprising:

a servo circuit for extracting a plurality of bits from a plurality of servo wedges;

a unique binary sequence block for receiving said plurality of bits from said servo circuit, for performing a comparison of said plurality of bits to a known sequence of bits, and for providing an output based on said comparison; and a confidence block for receiving said output and for adjusting a confidence level.

7. The apparatus of claim 6 further comprising:

a disk control block for control said disk drive based on said confidence level.

8. The apparatus of claim 7 wherein said disk control block inhibits writing of data to said disk drive if said confidence level falls below a first threshold.

9. The apparatus of claim 8 wherein said disk control block inhibits reading of data from said disk drive if said confidence level falls below a second threshold.

10. The apparatus of claim 9 wherein said disk control block initiates a initial position detection process if said confidence level falls below a third threshold.

11. Apparatus for determining position information for a disk drive comprising:

a servo circuit for extracting servo information from servo wedges on one or more disks of said disk drive and for providing a data output;

a unique binary sequence block for receiving said data output and for providing a qualification output; and a confidence block for receiving said qualification output and for providing a confidence level output.

12. The apparatus of claim 11 wherein said servo information comprises unique binary sequence data and wherein said data output comprises:

a first output for indicating good unique binary sequence data;

a second output for indicating bad unique binary sequence data; and a third output for indicating invalid unique binary sequence data.

13. The apparatus of claim 12 wherein said confidence level output comprises:

a fourth output for indicating sufficient confidence to enable writing data to said disk drive;

a fifth output for indicating sufficient confidence to enable reading data from said disk drive; and a sixth output for indicating a need to perform an initial position detection process.

14. A method for determining position information for a disk drive comprising the steps of:

writing a sequence of bits to a first plurality of servo wedges on one or more disks of said disk drive;

reading a plurality of bits from a second plurality of servo wedges on said one or more disks of said disk drive, wherein said first plurality of servo wedges comprises said second plurality of servo wedges;

performing a comparison of said plurality of bits to said sequence of bits;

calculating a confidence level based on said comparison; and providing a confidence level output.

15. The method of claim 14 further comprising the step of:

inhibiting writing of data to said one or more disks if said confidence level is less than a first threshold value.

16. The method of claim 15 further comprising the step of:

inhibiting reading of data from said one or more disks if said confidence level is less than a second threshold value.

17. The method of claim 14 further comprising the step of:

initiating an initial position detection process if said confidence level is less than a third threshold value.

* * * * *